(12) United States Patent
Liu et al.

(10) Patent No.: US 10,784,999 B2
(45) Date of Patent: Sep. 22, 2020

(54) NARROWBAND PHYSICAL BROADCAST CHANNEL DESIGN ON MULTIPLE ANCHOR CHANNELS

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/209,538

(22) Filed: Dec. 4, 2018

(65) Prior Publication Data

US 2019/0181995 A1    Jun. 13, 2019

Related U.S. Application Data

(60) Provisional application No. 62/596,684, filed on Dec. 8, 2017.

(51) Int. Cl.
*H04L 5/00* (2006.01)
*H04W 72/12* (2009.01)
(Continued)

(52) U.S. Cl.
CPC ........... *H04L 5/0035* (2013.01); *H04B 1/713* (2013.01); *H04L 5/0039* (2013.01);
(Continued)

(58) Field of Classification Search
CPC .......... H04B 1/713; H04B 2001/71362; H04L 5/0035; H04L 5/0039; H04L 5/0053;
(Continued)

(56) References Cited

U.S. PATENT DOCUMENTS

| | | | | |
|---|---|---|---|---|
| 2012/0140714 A1* | 6/2012 | Koskela | ................ | H04W 56/00 370/329 |
| 2013/0258938 A1* | 10/2013 | Sagfors | ................ | H04W 72/02 370/312 |

(Continued)

OTHER PUBLICATIONS

International Search Report and Written Opinion—PCT/US2018/064006—ISA/EPO—dated Feb. 27, 2019.
(Continued)

*Primary Examiner* — Stephen J Clawson
(74) *Attorney, Agent, or Firm* — Steven R. Thiel

(57) ABSTRACT

Techniques and apparatuses described herein facilitate narrowband communication within the unlicensed frequency spectrum by simultaneously transmitting (e.g., in adjacent channels) a plurality of anchor channels. For example, a base station may simultaneously transmit at least three anchor channels of 180 kHz each so that the 500 kHz minimum bandwidth requirement is satisfied. Furthermore, the techniques and apparatuses described herein provide discovery reference signal (DRS) structures to cause the different types of DRS to be repeated and/or transmitted on different anchor channels, which improves frequency diversity. Also, a synchronization signal of the anchor channels may be used to indicate a configuration of the anchor channels. Thus, synchronization in the NB-IoT-unlicensed (NB-IoT-u) spectrum is enabled, and efficiency is improved over synchronization using a single anchor channel.

60 Claims, 16 Drawing Sheets

(51) Int. Cl.
*H04B 1/713* (2011.01)
*H04W 72/04* (2009.01)
*H04W 56/00* (2009.01)
*H04W 48/10* (2009.01)
*H04W 8/00* (2009.01)
*H04W 16/14* (2009.01)
*H04B 1/7136* (2011.01)

(52) U.S. Cl.
CPC ............ *H04L 5/0053* (2013.01); *H04W 48/10* (2013.01); *H04W 56/001* (2013.01); *H04W 72/0446* (2013.01); *H04W 72/1289* (2013.01); *H04B 2001/71362* (2013.01); *H04W 8/005* (2013.01); *H04W 16/14* (2013.01)

(58) Field of Classification Search
CPC ... H04W 16/14; H04W 48/10; H04W 56/001; H04W 72/0446; H04W 72/1289; H04W 8/005
See application file for complete search history.

(56) References Cited

U.S. PATENT DOCUMENTS

2014/0341091 A1* 11/2014 Ji .......................... H04L 5/1469
370/280
2016/0135124 A1* 5/2016 Vos ................... H04W 52/0216
370/311
2017/0094621 A1 3/2017 Xu et al.

OTHER PUBLICATIONS

Nokia Alcatel-Lucnt Shanghai Bell: "NR-PBCH Design," 3GPP Draft; R1-1612807, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051176749, 8 pages, Retrieved from the Internet: URL: http://www.3gpp.org/ftp/Meetings_3GPP_SYNC/RAN1/Docs/ [retrieved on Nov. 13, 2016].

* cited by examiner

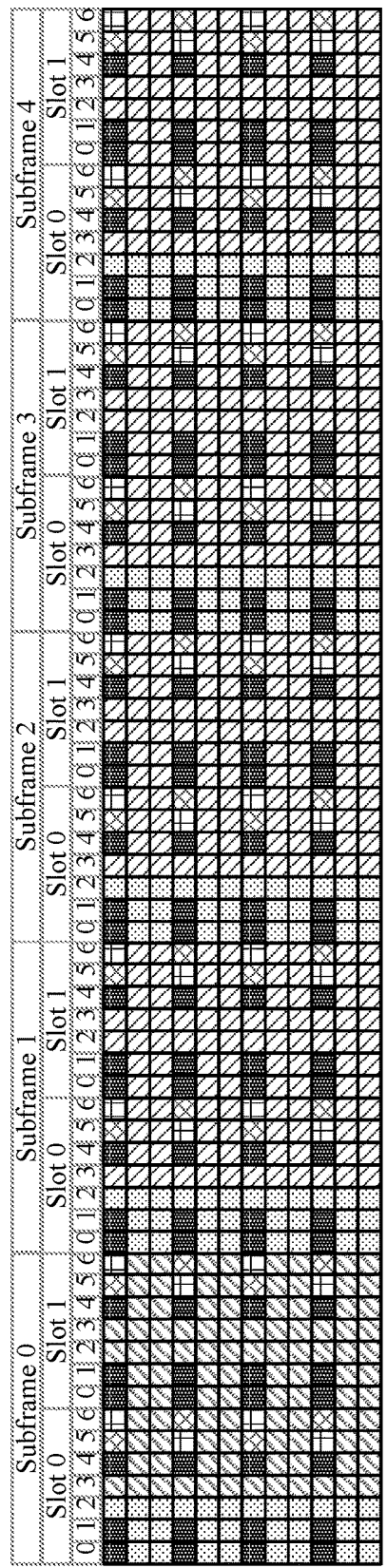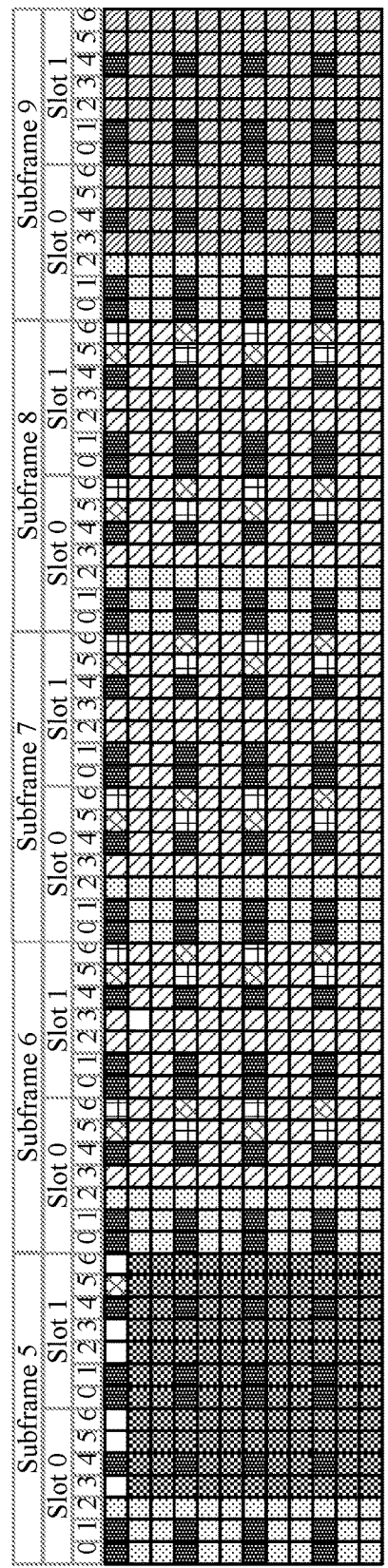
FIG. 3A

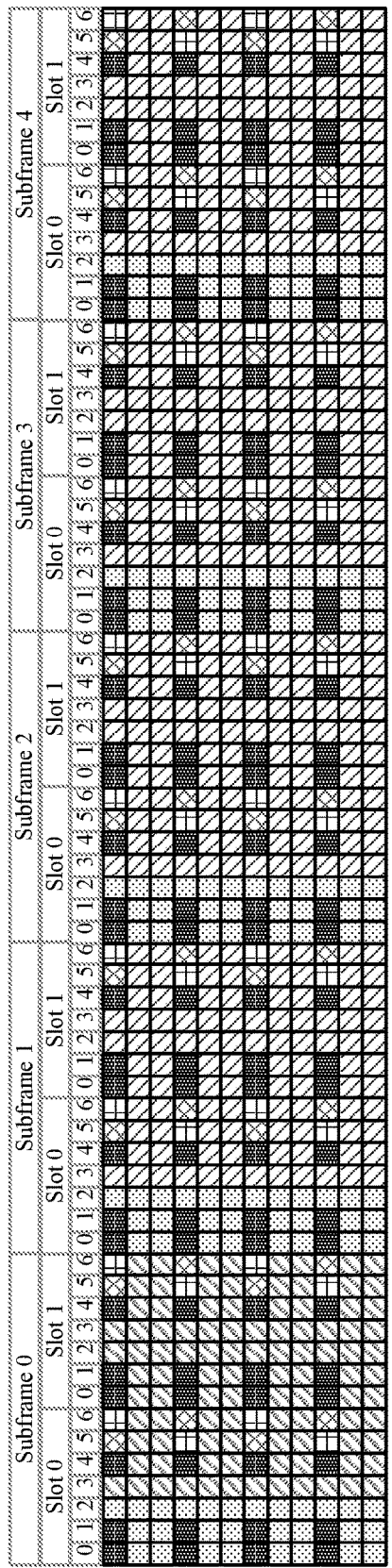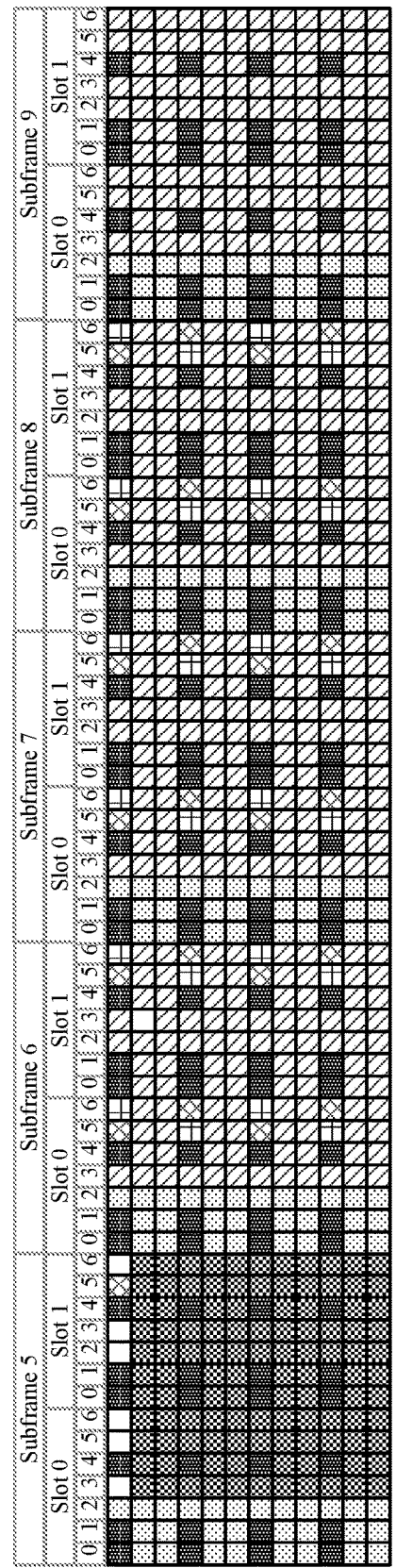
FIG. 3B

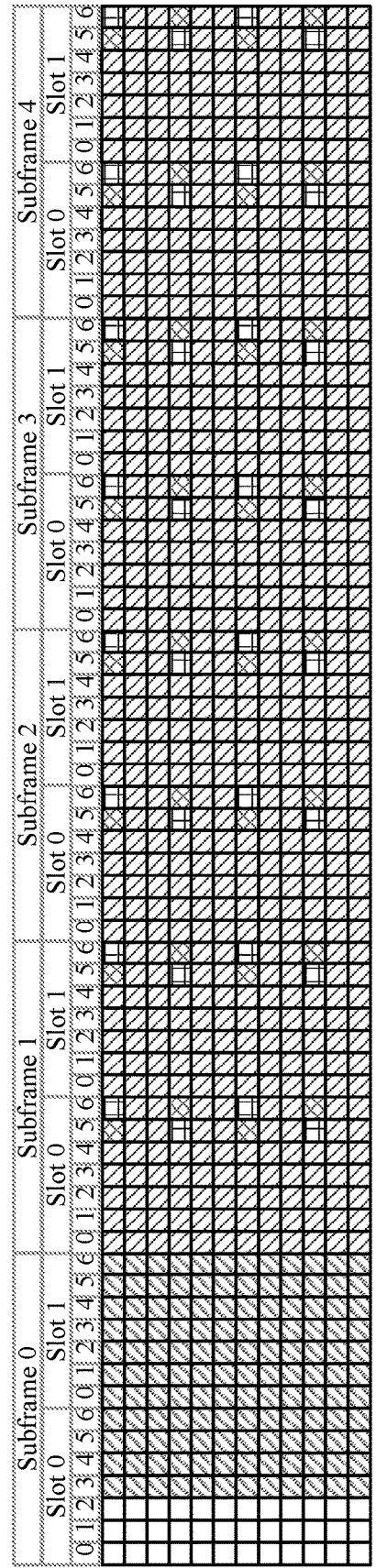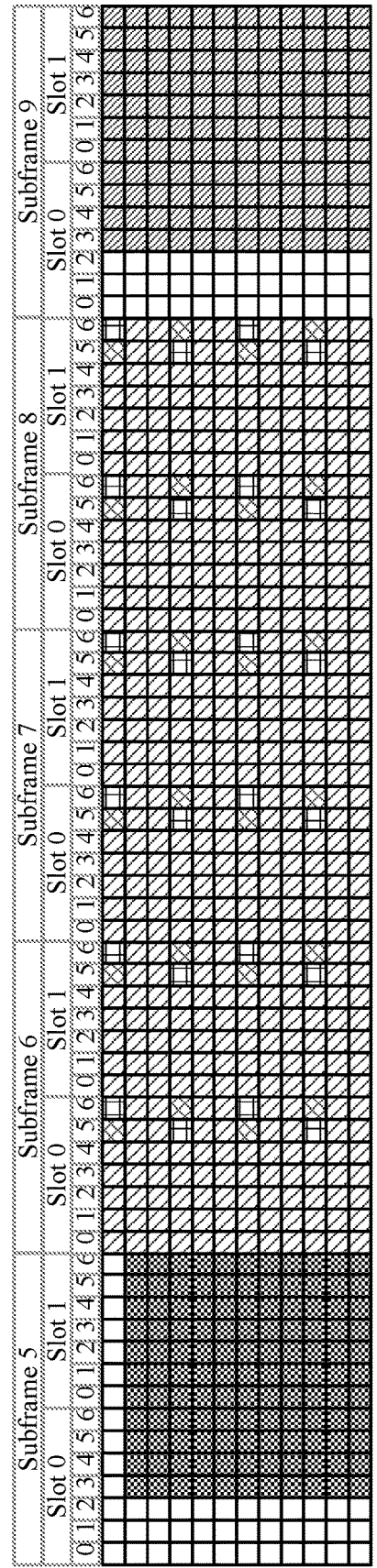
FIG. 3C

FIG. 3D

NARROWBAND PHYSICAL BROADCAST CHANNEL DESIGN ON MULTIPLE ANCHOR CHANNELS

CROSS-REFERENCE TO RELATED APPLICATIONS UNDER 35 U.S.C. § 119

This application claims priority to Provisional Patent Application No. 62/596,684, filed on Dec. 8, 2017, entitled "TECHNIQUES AND APPARATUSES FOR NARROWBAND PHYSICAL BROADCAST CHANNEL DESIGN ON MULTIPLE ANCHOR CHANNELS," which is hereby expressly incorporated by reference herein.

BACKGROUND

Field

Aspects of the present disclosure generally relate to wireless communication, and more particularly to techniques and apparatuses for narrowband physical broadcast channel (NPBCH) design on multiple anchor channels (e.g., in a narrowband system).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

SUMMARY

Narrowband communications involve communicating with a limited frequency bandwidth as compared to the frequency bandwidth used for LTE communications. One example of narrowband communication is NB-IoT communication, which may be limited to a single RB of system bandwidth (e.g., 180 kHz). Another example of narrowband communication is eMTC, which may be limited to six RBs of system bandwidth (e.g., 1.08 MHz). NB-IoT communication and/or eMTC may reduce device complexity, enable multi-year battery life, and provide deeper coverage to reach challenging locations such as deep inside buildings.

In certain eMTC configurations, the channel bandwidth for narrowband communications may be six RBs with various repetition levels to support low complexity devices and high efficiency power amplifiers (PA). In certain NB-IoT configurations, the channel bandwidth for narrowband communications may be restricted to a single tone (e.g., 3.75 kHz) to support low complexity devices and high efficiency PA.

However, supporting a six-RB (e.g., 1.08 MHz) communication bandwidth and/or a single tone (e.g., 3.75 kHz, etc.) communication bandwidth may not be possible due to certain power spectral density (PSD) restrictions (e.g., transmission power restrictions) and bandwidth requirements for narrowband communications (e.g., eMTC and/or NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.).

For example, the PSD used for digital modulation (e.g., differential time signaling (DTS) modulation) in the United States may be limited to a maximum of 8 dBm/3 kHz. Hence, a UE may not be able to transmit a single tone transmission using full power in the unlicensed spectrum because the maximum PSD is limited to a bandwidth (e.g., 3 kHz) that is smaller than a single tone (e.g., 3.75 kHz). Further, the system bandwidth for narrowband communications using the unlicensed frequency spectrum in the United States may be restricted to, for example, 500 kHz. In other words, when using some digital modulation modes (e.g., DTS), a base station may have to meet the minimum bandwidth requirement (e.g., 500 kHz) and the PSD limit (e.g., 8 dBm/3 kHz) in order to be allowed to operate in the United States (and certain other countries).

A base station may transmit discovery reference signals (DRS) for synchronization of UEs covered by the base station. A discovery reference signal as described herein may include, for example, a narrowband primary synchronization signal, a narrowband secondary synchronization signal, a narrowband physical broadcast channel (e.g., which may include a master information block), a system information block, a synchronization signal block, and/or the like. A discovery reference signal may be transmitted in a channel which may be termed an anchor channel. A frequency of the anchor channel may be known to UEs covered by the base station. In a legacy approach, the DRS may be transmitted periodically (e.g., regularly) on a single channel or RB. However, the base station may need to meet the minimum bandwidth requirement and the PSD limit with regard to the discovery reference signal.

Techniques and apparatuses described herein facilitate narrowband communication within the unlicensed frequency spectrum by simultaneously transmitting (e.g., in adjacent channels) a plurality of anchor channels. For example, the base station may simultaneously transmit at least three anchor channels of 180 kHz each so that the 500 kHz minimum bandwidth requirement is satisfied. Furthermore, the techniques and apparatuses described herein provide DRS structures to cause the different types of DRS to be repeated and/or transmitted on different anchor channels, which improves frequency diversity. In some aspects, the UE may determine, or the BS may indicate, a configuration of the at least three anchor channels based at least in part on a synchronization signal received on a first anchor channel (e.g., a cyclic shift of the synchronization signal received on the first anchor channel). Thus, synchronization in the NB-IoT-unlicensed (NB-IoT-u) spectrum is enabled while complying with PSD restrictions, and efficiency is improved over synchronization using a single anchor channel.

In aspects of the disclosure, a method, a user equipment (UE), a base station, an apparatus, and a computer program product are provided.

In some aspects, the method may by performed by a base station. The method may include determining a plurality of anchor channels, wherein a first anchor channel of the plurality of anchor channels includes at least one synchronization signal, and wherein at least two anchor channels of the plurality of anchor channels include a broadcast channel and/or an information block; simultaneously transmitting the plurality of anchor channels to at least one UE; and communicating with the at least one UE based at least in part on the plurality of anchor channels.

In some aspects, the base station may include a memory and one or more processors operatively coupled to the memory. The memory and the one or more processors may be configured to determine a plurality of anchor channels, wherein a first anchor channel of the plurality of anchor channels includes at least one synchronization signal, and wherein at least two anchor channels of the plurality of anchor channels include a broadcast channel and/or an information block; simultaneously transmit the plurality of anchor channels to at least one UE; and communicate with the at least one UE based at least in part on the plurality of anchor channels.

In some aspects, the apparatus may include means for determining a plurality of anchor channels, wherein a first anchor channel of the plurality of anchor channels includes at least one synchronization signal, and wherein at least two anchor channels of the plurality of anchor channels include a broadcast channel and/or an information block; means for simultaneously transmitting the plurality of anchor channels to at least one UE; and means for communicating with the at least one UE based at least in part on the plurality of anchor channels In some aspects, the computer program product may include a non-transitory computer-readable medium storing one or more instructions. The one or more instructions, when executed by one or more processors of a base station, may cause the one or more processors to determine a plurality of anchor channels, wherein a first anchor channel of the plurality of anchor channels includes at least one synchronization signal, and wherein at least two anchor channels of the plurality of anchor channels include a broadcast channel and/or an information block; simultaneously transmit the plurality of anchor channels to at least one UE; and communicate with the at least one UE based at least in part on the plurality of anchor channels.

In some aspects, the method may by performed by a UE. The method may include receiving at least one synchronization signal on a first anchor channel, wherein the first anchor channel is one of a plurality of anchor channels that were simultaneously transmitted; receiving a broadcast channel and/or an information block on the first anchor channel and at least one other anchor channel of the plurality of anchor channels; and performing a synchronization operation based at least in part on the synchronization signal.

In some aspects, the UE may include a memory and one or more processors operatively coupled to the memory. The memory and the one or more processors may be configured to receive at least one synchronization signal on a first anchor channel, wherein the first anchor channel is one of a plurality of anchor channels that were simultaneously transmitted; receive a broadcast channel and/or an information block on the first anchor channel and at least one other anchor channel of the plurality of anchor channels; and perform a synchronization operation based at least in part on the synchronization signal.

In some aspects, the apparatus may include means for receiving at least one synchronization signal on a first anchor channel, wherein the first anchor channel is one of a plurality of anchor channels that were simultaneously transmitted; means for receiving a broadcast channel and/or an information block on the first anchor channel and at least one other anchor channel of the plurality of anchor channels; and means for performing a synchronization operation based at least in part on the synchronization signal.

In some aspects, the computer program product may include a non-transitory computer-readable medium storing one or more instructions. The one or more instructions, when executed by one or more processors of a UE, may cause the one or more processors to receive at least one synchronization signal on a first anchor channel, wherein the first anchor channel is one of a plurality of anchor channels that were simultaneously transmitted; receive a broadcast channel and/or an information block on the first anchor channel and at least one other anchor channel of the plurality of anchor channels; and perform a synchronization operation based at least in part on the synchronization signal.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 3A-3D are diagrams illustrating examples of a narrowband (NB) frame structure for in-band deployment inside an LTE carrier (even radio frame), an NB frame structure for in-band deployment inside an LTE carrier (odd radio frame), an NB frame structure for guard band/stand-alone deployment inside an LTE carrier (even radio frame), and an NB frame structure for guard band/standalone deployment inside an LTE carrier (even radio frame), respectively.

DETAILED DESCRIPTION

Figure 1:
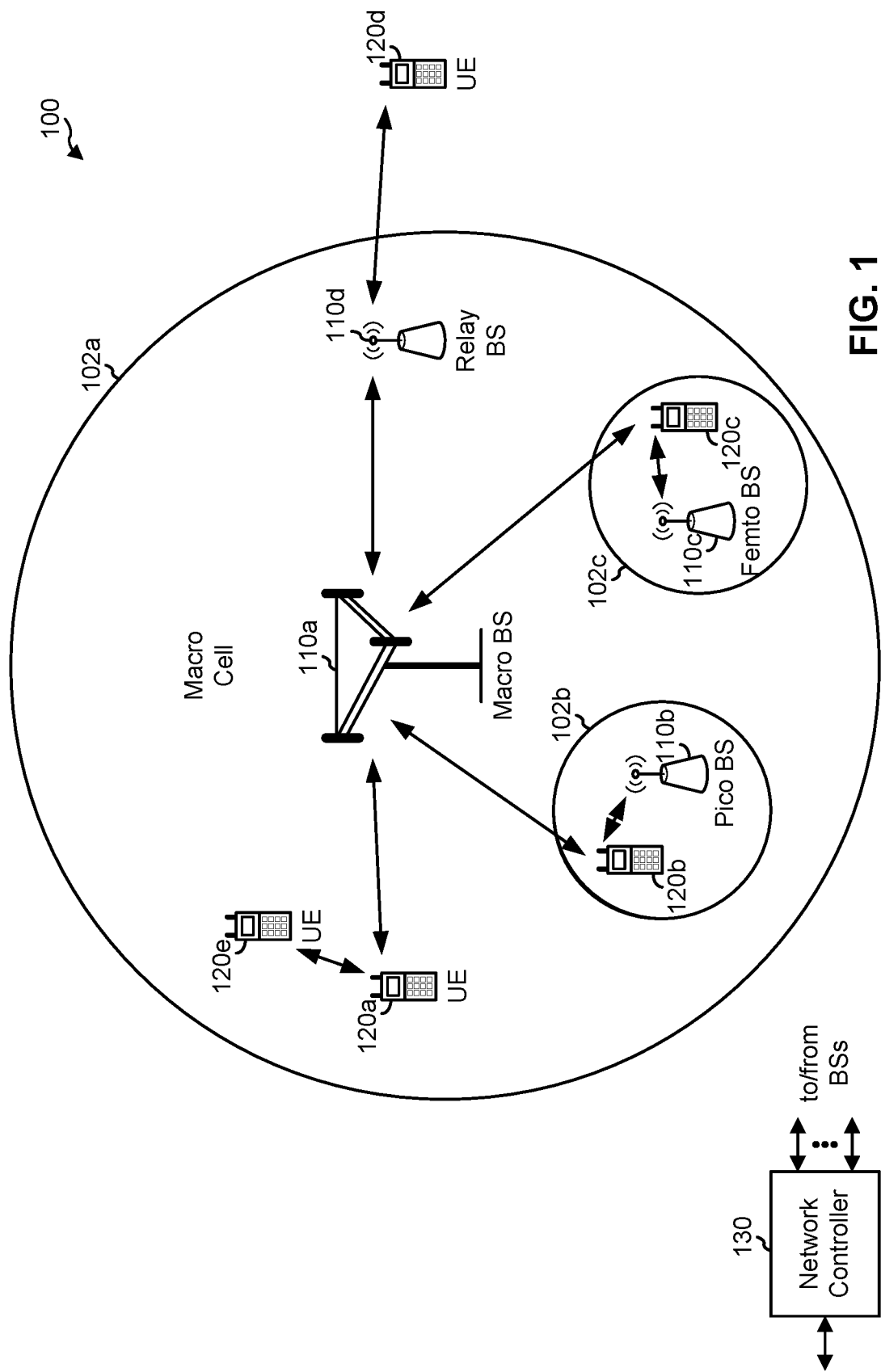
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110*c*, and BS 110*d*) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "AP", "node B", "5G NB", and "cell" may be used interchangeably herein. A BS may transmit signals for discovery and synchronization of a UE, such as discovery reference signals, synchronization signals, and/or the like.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices or NB-IoT-U (unlicensed) devices, which may operate in an unlicensed spectrum, as described in more detail elsewhere herein. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
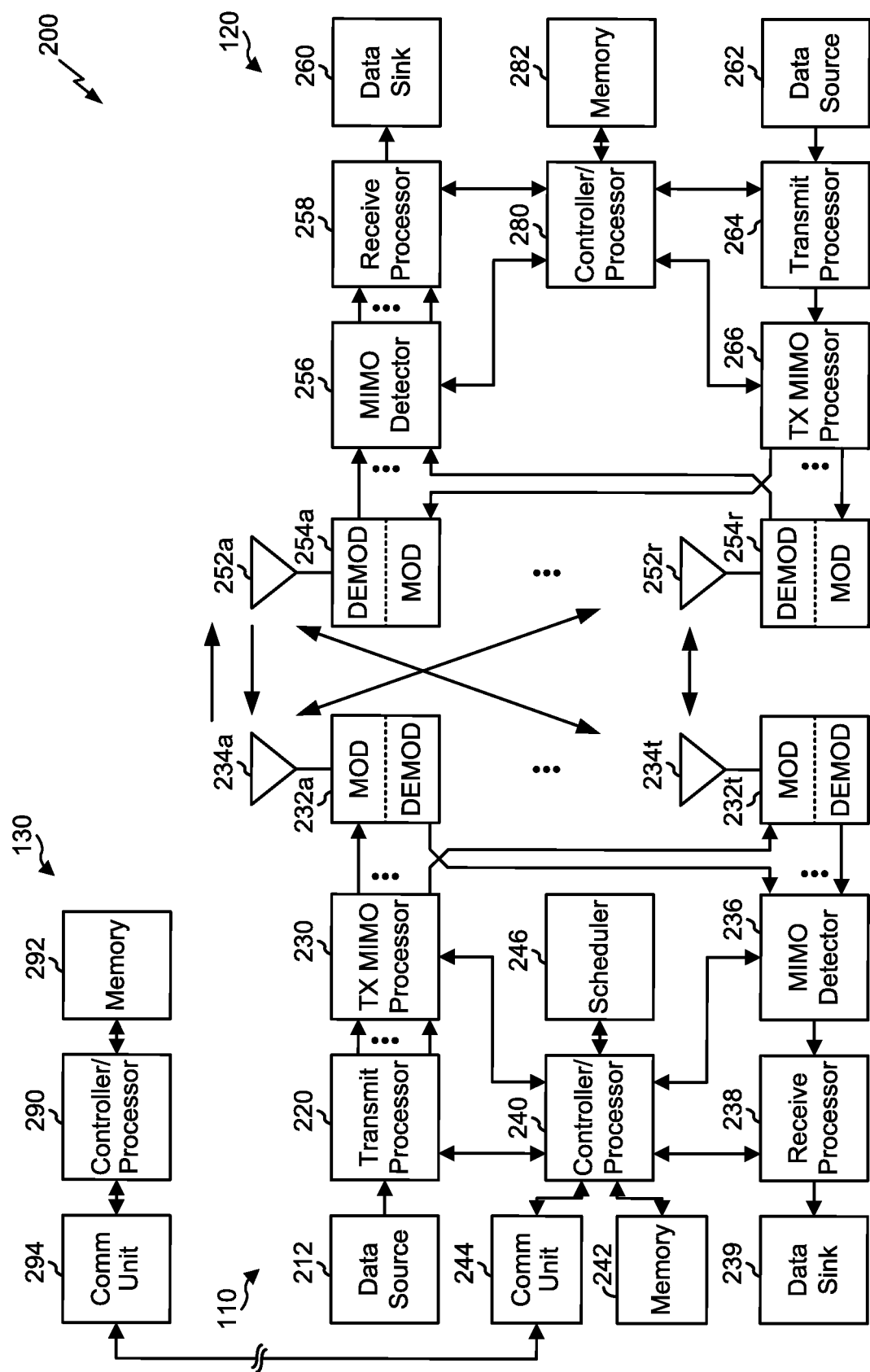
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the narrowband primary synchronization signal (NPSS) and narrowband secondary synchronization signal (NSSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information (e.g., from a master information block such as a narrowband master information block, a system information block, a narrowband physical broadcast channel, and/or the like) to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with discovery reference signaling in a narrowband system with multiple anchor channels, as described in more detail elsewhere herein. For example, controller/processor 240 of BS 110, controller/processor 280 of UE 120, and/or any other component(s) of FIG. 2 may perform or direct operations of, for example, method 700 of FIG. 7, method 1000 of FIG. 10, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3D:
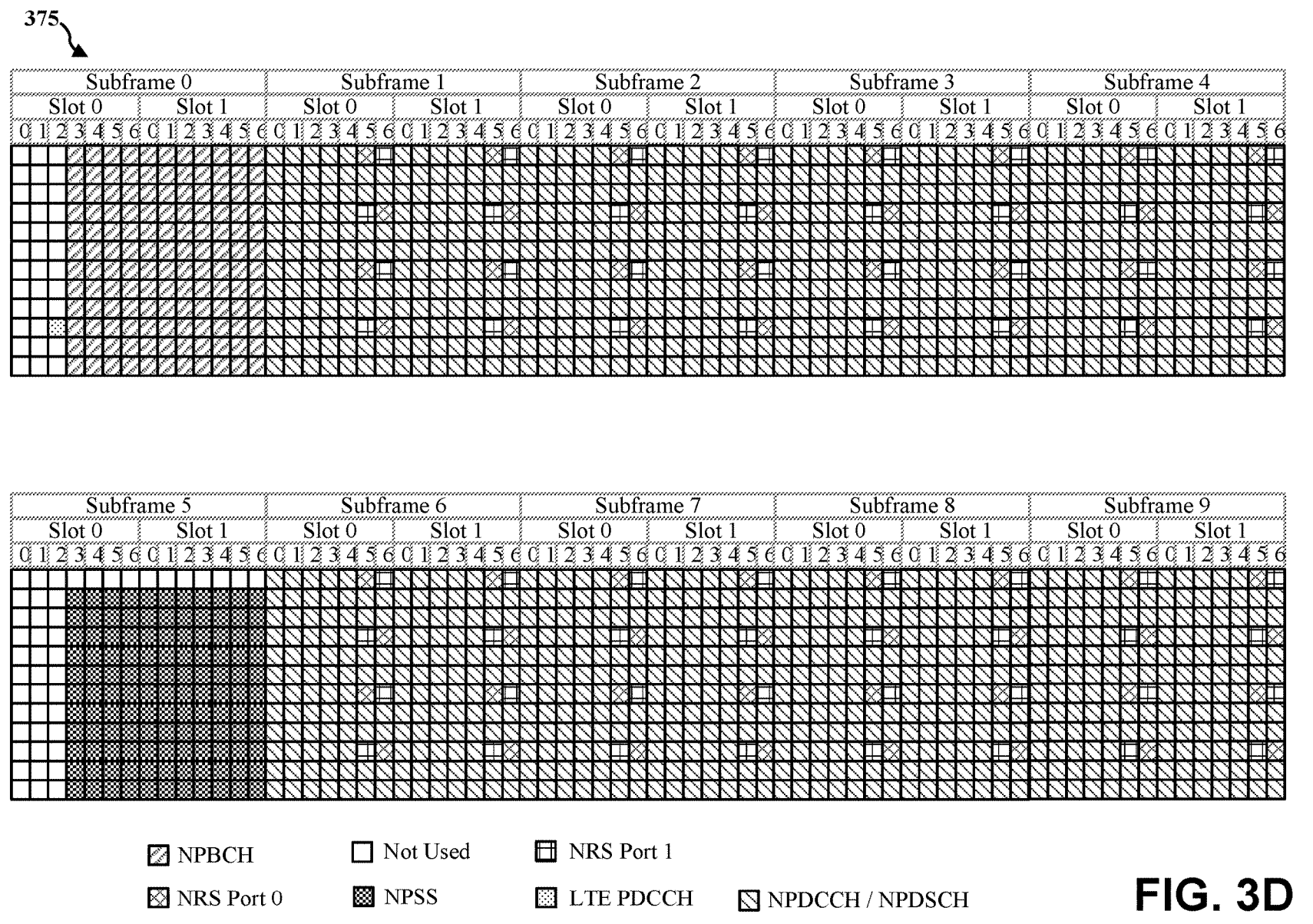

FIG. 3A is a diagram 300 illustrating an example of an NB frame structure for in-band deployment inside an LTE carrier (even radio frame). FIG. 3B is a diagram 325 illustrating an example of an NB frame structure for in-band deployment inside an LTE carrier (odd radio frame). FIG. 3C is a diagram 350 illustrating an example of an NB frame structure for guard band/standalone deployment inside an LTE carrier (even radio frame). FIG. 3D is a diagram 375 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB-IoT may utilize RBs within the global system for mobile communications (GSM) carriers.

As illustrated in FIGS. 3A-3D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for Multicast Broadcast Single Frequency Network (MBSFN), as illustrated in FIGS. 3A and 3B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, a narrowband primary synchronization signal (NPSS) may be transmitted in subframe 5 of even and odd radio frames, and a narrowband secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 3A and 3B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 3C and 3D.

The narrowband physical broadcasting channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 3A and 3B, NPBCH symbols may be mapped around the NRS and the LTE CRS for the in-band deployment. As illustrated in FIGS. 3C and 3D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In radio resource control (RRC) signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

As indicated above, FIGS. 3A-3D are provided as examples. Other examples are possible and may differ from what was described in connection with FIGS. 3A-3D.

Figure 4A:
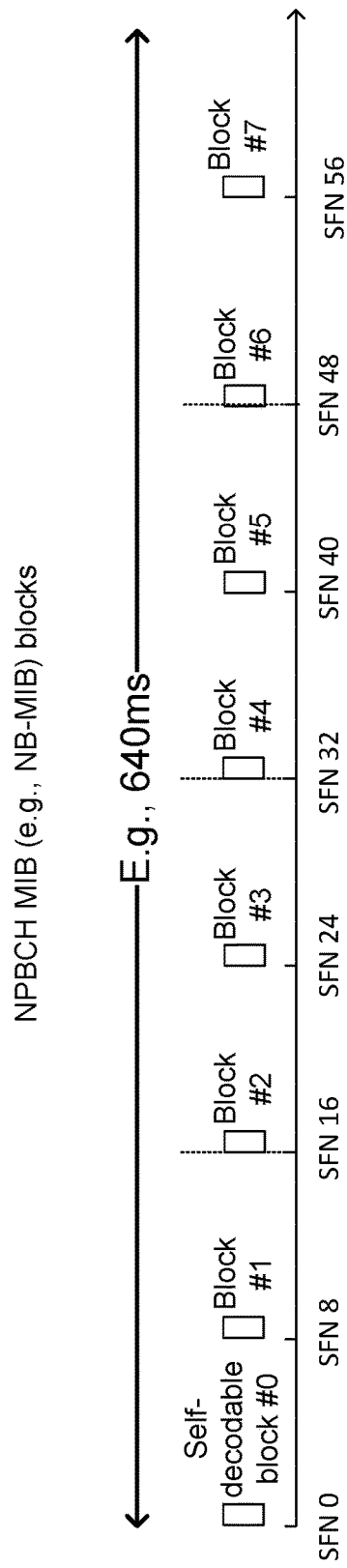
FIG. 4A is a diagram illustrating an example of a NB discovery reference signal structure for a single anchor channel.

FIG. 4A is a diagram illustrating an example 400 of a NB discovery reference signal structure for a single anchor channel. The transmissions described in connection with FIG. 4A may be performed by a base station (e.g., BS 110, etc.). As shown in FIG. 4, NPBCH MIB blocks (hereinafter referred to as discovery reference signals (DRSs)) may be transmitted at a regular interval. For example, the DRS may be transmitted at an interval of 8 SFNs (e.g., 80 ms). In some aspects, the 4 most significant bits (MSB) of the MIB payload of the NPBCH MIB blocks may indicate the synchronization cycle. For example, and starting at SFN=0, the MIB payload of all 8 of the MIB blocks may be the same from an SFN #64·m to an SFN #64·m+63 (e.g., an entire 640 ms segment). Thus, a synchronizing UE can identify the 640 ms segment during synchronization. In some aspects, the 640 ms segment may be referred to herein as an information block cycle.

In some aspects, as described in connection with FIGS. 3A-3D, above, the NPBCH MIB blocks may include different information. For example, each MIB block may include particular information that identifies the portion of the 640 ms segment associated with the MIB block. Furthermore, each NPBCH MIB block may be self-decodable. Thus, a UE 120 may identify the current NPBCH MIB block and the current portion of the 640 ms segment based at least in part on descrambling or receiving a single NPBCH MIB block.

However, in certain systems, such as unlicensed spectrum systems, regulations may require a minimum bandwidth greater than that of the single anchor channel. Thus, it may be beneficial to provide a discovery reference signal structure that uses a bandwidth greater than the minimum bandwidth. Such a discovery reference signal structure is described below.

As indicated above, FIG. 4A is provided as an example. Other examples are possible and may differ from what was described in connection with FIG. 4A.

Figure 4B:
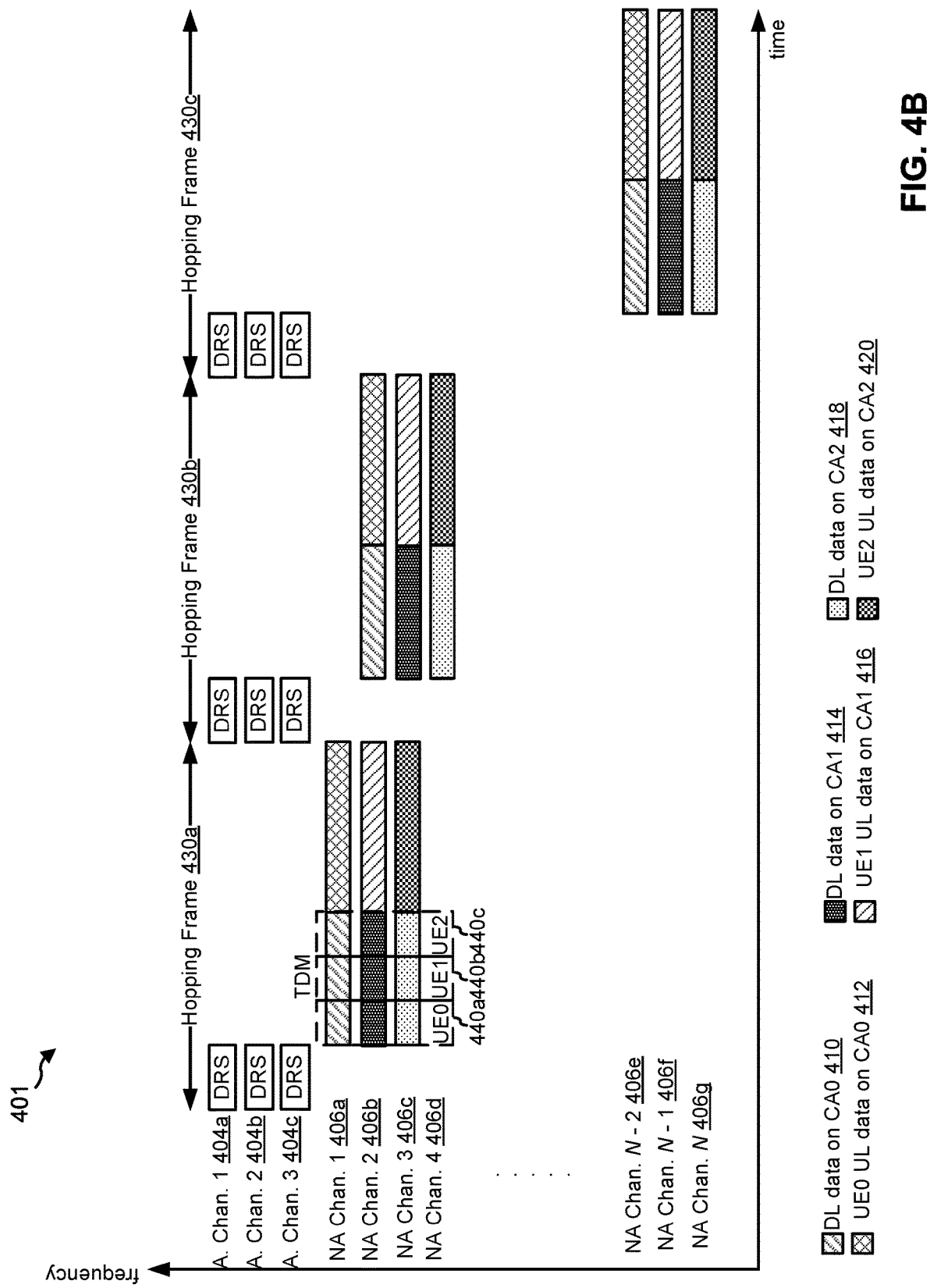
FIG. 4B is a diagram illustrating a frequency hopping pattern that may be used for narrowband communications in the unlicensed frequency spectrum between a base station and a UE.

FIG. 4B illustrates a frequency hopping pattern 401 that may be used for narrowband communications in the unlicensed frequency spectrum between a base station and a UE in accordance with certain aspects of the disclosure. The frequency hopping pattern 401 illustrated in FIG. 4B may be used for narrowband communications between a base station (e.g., base station 110, the apparatus 802/802') operating in DTS mode and a UE (e.g., UE 120, the apparatus 1102/1102') operating in frequency hopping mode. Because the base station is operating in DTS mode in the unlicensed frequency spectrum, DL data sent from the base station may need to occupy at least a minimum bandwidth (e.g., 500 kHz) at the expense of scheduling flexibility, and due to the PSD limit (e.g., 8 dBm/3 kHz) associated with DTS mode, the DL data may be transmitted in at least 3 RB in order to transmit at the maximum TX power of 30 dBm. Because the UE is operating in frequency hopping mode in the unlicensed frequency spectrum, the UE may send UL data to the base station in N>x (e.g., x=50) hopping frequencies that each have at least a minimum bandwidth (e.g., 180 kHz, 200 kHz, etc.).

A base station operating in DTS mode may use the frequency hopping pattern 401 illustrated in FIG. 4B to monitor, receive, and/or transmit signals by switching among different frequency channels (e.g., anchor channels 404a, 404b, 404c and non-anchor channels 406a, 406b, 406c, 406d, 406e, 406f, 406g) to exploit the frequency diversity of the unlicensed frequency spectrum.

At the start of each hopping frame 430a, 430b, 430c, the base station may concurrently transmit a discovery reference signal (DRS) (e.g., NPSS, NSSS, NPBCH, and SIB-BR etc.) in each of the plurality of anchor channels 404a, 404b, 404c to at least one UE. The NPSS and NSSS may be used by a UE for initial synchronization, cell acquisition, timing estimation, and/or frequency estimation.

Because the bandwidth of each anchor channel 404a, 404b, 404c may be limited to the bandwidth capability of the UE's receiver (e.g., 1 RB, 180 kHz, 200 kHz, etc.), the bandwidth requirement (e.g., 180 kHz) associated with DTS mode may be satisfied. Each of the non-anchor channels 406a, 406b, 406c, 406d, 406e, 406f, 406g may be used to communicate DL data and UL data. The UL data may be communicated by a UE operating in frequency hopping mode.

The anchor channels 404a, 404b, 404c may each be used to carry information that indicates the frequency hopping pattern 401 to the UE. For example, the information may indicate a duration of a hopping frame 430a, 430b, 430c (e.g., 160 ms, 320 ms, etc.); a duration of DRS transmissions (e.g., 2 radio frames, 4 radio frames, etc.) in each hopping frame 430a, 430b, 430c; an M number of non-anchor hopping channels per hopping frame (e.g., M=3 in FIG. 4B); a duration on non-anchor hopping channels (e.g., 14 radio frames, 28 radio frames, etc.); a duration of DL data transmission(s) (e.g., 7 radio frames, 14 radio frames, etc.); a duration of UL data transmission(s) (e.g., 7 radio frames, 14 radio frames, etc.); a channel offset between each of the M non-anchor channels within each hopping frame 430a, 430b, 430c; a channel offset associated with M non-anchor channels located in adjacent hopping frames; a grouping of the M non-anchor channels into M carriers; a fixed offset associated with the non-anchor channels in each of the M carriers; etc. Out of the maximum number of narrowband channels (e.g., 100 narrowband channels) within the wideband channel, the information may also indicate that communications between the base station and the UE may occur on a subset of the maximum number of narrowband channels (e.g., 50 out of 100 of the narrowband channels).

In the example illustrated in FIG. 4B, the frequency hopping pattern 401 may include a plurality of hopping frames 430a, 430b, 430c that each include a plurality of anchor channels (e.g., three anchor channels) and a plurality of non-anchor channels (e.g., N non-anchor channels). The first hopping frame 430a may include the anchor channels 404a, 404b, 404c, the first non-anchor channel 406a, the second non-anchor channel 406b, and the third non-anchor channel 406c. The second hopping frame 430b may include the anchor channels 404a, 404b, 404c, the second non-anchor channel 406b, the third non-anchor channel 406c, and the fourth non-anchor channel 406d. The third hopping frame 430c may include the anchor channels 404a, 404b, 404c, the (N-2)th non-anchor channel 404e, the (N-1)th non-anchor channel 404f, and the Nth non-anchor channel 404g. In certain configurations, the non-anchor hopping channels located in a particular hopping frame may be contiguous non-anchor hopping channels within the wideband. In certain other configurations, the non-anchor hopping channels located in a particular hopping frame may be non-contiguous non-anchor hopping channels within the wideband. In certain other configurations, the anchor channels 404a, 404b, 404c may be contiguous channels within the wideband. In certain other configurations, the anchor channels 404a, 404b, 404c may be non-contiguous channels within the wideband.

In certain configurations, each of the N non-anchor channels across multiple hopping frames 430a, 430b, 430c may be grouped into M carriers. Each of the M carriers (e.g., carrier 0 (CA0), carrier 1 (CA1), and carrier 2 (CA2), where M=3) may occupy a set of non-anchor channels across the plurality of hopping frames 430a, 430b, 430c. In the example illustrated in FIG. 4B, CA0 may occupy the first non-anchor channel 406a in the first hopping frame 430a, the second non-anchor channel 406b in the second hopping frame 430b, and the (N-2)th non-anchor channel 406e in the third hopping frame 430c. As also seen in the example illustrated in FIG. 4B, CA1 may occupy the second non-anchor channel 406b in the first hopping frame 430a, the third non-anchor channel 406c in the second hopping frame 430b, and the (N-1)th non-anchor channel 406f in the third hopping frame 430c. As also seen in the example illustrated in FIG. 4B, CA2 may occupy the third non-anchor channel 406c in the first hopping frame 430a, the fourth non-anchor channel 406d in the second hopping frame 430b, and the Nth non-anchor channel 406g in the third hopping frame 430c.

By way of example, when N=8, CA0 may be associated with the non-anchor channel hopping sequence [1, 2, 6], CA1 is associated with the non-anchor channel hopping sequence [2, 3, 7], and CA2 is associated with the non-anchor channel hopping sequence [3, 4, 8]. In other words, the non-anchor channel hopping sequence may be a pseudo-random hopping sequence with different fixed offsets between non-anchor channels in different hopping frames. For example, the fixed offset between the first non-anchor channel of a carrier in first hopping frame 430a and the second non-anchor channel of the same carrier in second hopping frame 430b is one non-anchor channel, and the fixed offset between the second non-anchor hopping channel of the same carrier in the second hopping frame 430b and the third non-anchor carrier of the same carrier in the third hopping frame 430c is four non-anchor hopping channels.

Each of the M carriers may serve the same or different UEs. In certain configurations, CA0, CA1, and CA2 may each serve UE 0. In certain other configurations, CA0 and CA1 may serve UE 0, and CA2 may serve UE 1. In certain other configurations, CA0 may serve UE 0, CA1 may serve UE 1, and CA 2 may serve UE 2.

In certain aspects, each of the M carriers may have a same frame structure. As shown in FIG. 4B, and by reference number 410, downlink (DL) data on CA0 may be provided in a portion indicated by a first fill pattern. As shown by reference number 412, UL data on CA0 for UE 0 may be provided in a portion indicated by a second fill pattern. As shown by reference number 414, DL data on CA1 may be provided in a portion indicated by a third fill pattern. As shown by reference number 416, UL data on CA1 for UE 1 may be provided in a portion indicated by a fourth fill pattern. As shown by reference number 418, DL data on CA 2 may be provided in a portion indicated by a fifth fill pattern. As shown by reference number 420, UL data on CA2 for UE 2 may be provided in a portion indicated by a sixth fill pattern.

In certain configurations, the DL data portions for CA0, CA1, and CA2 may be associated with DL data transmitted to UE 0, UE 1, and UE 2, respectively. In other words, the DL data in the DL data portions for UE 0, UE 1, and UE 2 may be transmitted concurrently in the time domain.

In certain other configurations, a first duration 440a of each of the DL data portions may be reserved for DL data transmitted to UE 0; a second duration 440b of each of the DL data portions may be reserved for DL data transmitted to UE 1; and a third duration 440c of each of the DL data portions may be reserved for DL data transmitted to UE 2. In other words, the DL data for UE 0, UE 1, and UE 2 may be time division multiplexed (TDM) in each of the M carriers.

In certain other configurations, a total bandwidth of each of the M carriers may meet a bandwidth threshold (e.g., 180 kHz, 200 kHz, 1 RB, etc.). In other words, the base station may schedule DL data on each of the M carriers for one or more UEs concurrently to ensure the DL bandwidth is at least 500 kHz (e.g., the minimum bandwidth requirement for DTS mode). When the base station has DL data to schedule for a single UE instead of multiple UEs and the single UE is not served by all of the M carriers, the DL data may be transmitted on a first carrier of the M carrier (e.g., CA0 in FIG. 4B), and a retransmission of the DL data may be transmitted on the remaining carriers of the M carriers (e.g., CA1 and CA2 in FIG. 4B) to ensure that the minimum DL bandwidth is at least 500 kHz. In certain other configurations, when there is no DL data to be scheduled, the base station may send a reservation signal on each of the M carriers in order to meet the bandwidth threshold. In the case of a single UE or no DL data to schedule, the power consumption at the base station may be increased in order to repeat DL data transmissions on multiple carriers, or to transmit reservation signals on multiple carriers.

Using the techniques described above in connection with FIG. 4B, a narrowband system of the present disclosure may be able to meet the bandwidth threshold and the PSD limit for DL data when the base station operates in DTS mode, and to meet the minimum number of hopping frequencies for UL data when the UE operates in frequency hopping mode.

As indicated above, FIG. 4B is provided as an example. Other examples may differ from what was described in connection with FIG. 4B.

Figure 5:
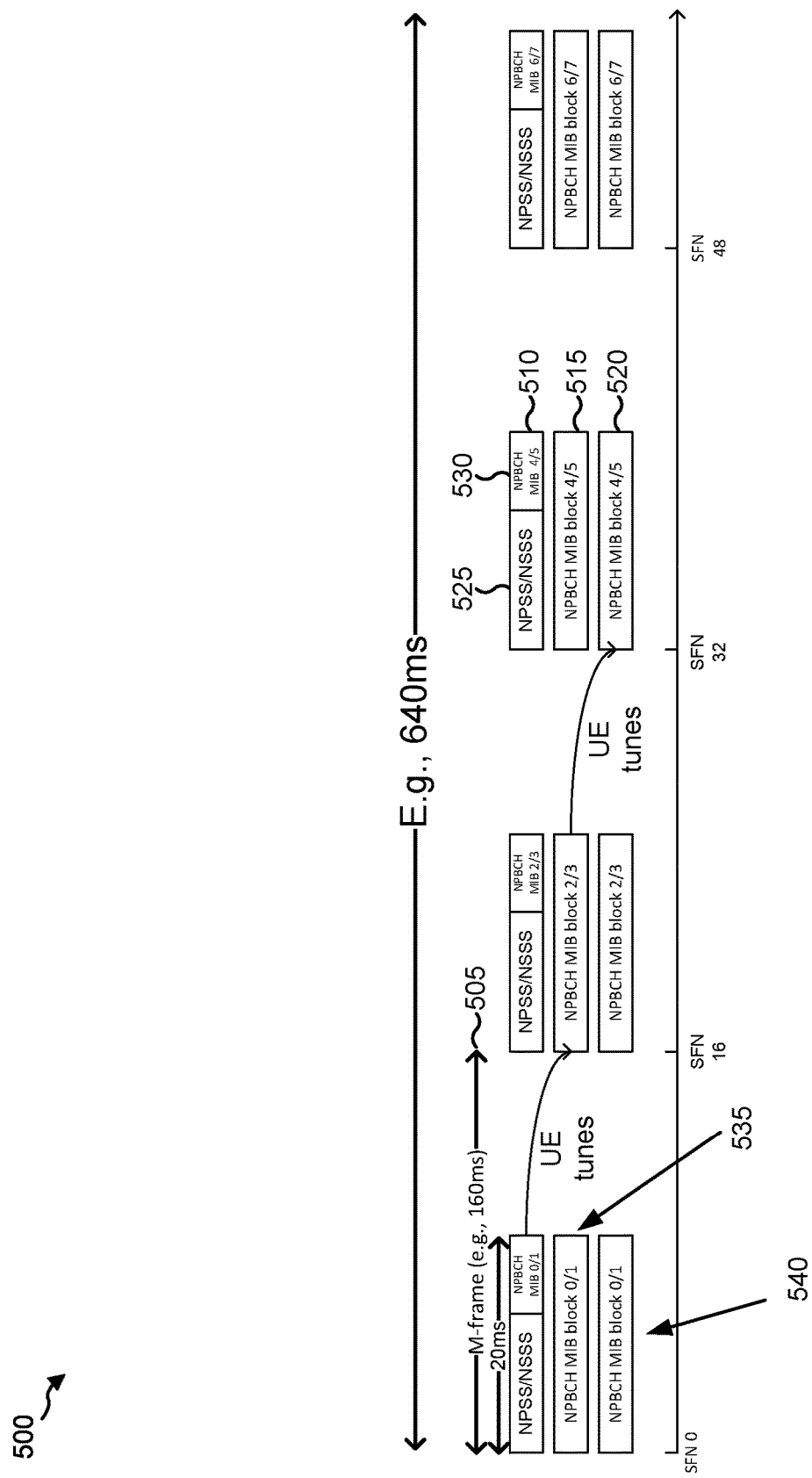
FIG. 5 is a diagram illustrating an example of a synchronization cycle for multiple anchor channels in a narrowband system.

FIG. 5 is a diagram illustrating an example 500 of a synchronization cycle for multiple anchor channels in a narrowband system. In example 500, a BS 110 (not shown) may transmit a plurality of anchor channels to at least one UE 120 (also not shown). In example 500, and as shown by reference number 505, a plurality of anchor channels is transmitted every 16 subframes (e.g., 160 ms), which corresponds to a hopping frame (e.g., shown as M-frame). As used herein, a hopping frame may be 160 ms, 320 ms, the same length as an NB-IoT-u frame (n-frame), an MTC frame (m-frame), and/or the like. As shown, each transmission of the plurality of anchor channels includes a first anchor channel 510, a second anchor channel 515, and a third anchor channel 520. In some aspects, the plurality of anchor channels may include a different number of anchor channels, such as 2 anchor channels, 4 anchor channels, 6 anchor channels, or a different number of anchor channels. The BS 110 may transmit the plurality of anchor channels so that a minimum bandwidth (e.g., associated with an unlicensed spectrum, a digital transmission requirement, and/or the like) is satisfied. For example, each anchor channel may include 1 resource block (e.g., RB). In some aspects, each anchor channel may have a bandwidth of approximately 180 kHz, 200 kHz, and/or the like, so that a minimum bandwidth of 500 kHz is satisfied for the plurality of anchor channels. As shown above the left-most transmission of the plurality of anchor channels, in some aspects, each transmission of the plurality of anchor channels may be approximately 20 ms in length. In some aspects, a transmission of the plurality of anchor channels may be longer or shorter than 20 ms.

As shown by reference number 525, at least one synchronization signal (e.g., a NPSS and/or an NSSS) may be included in a first anchor channel of each transmission of the plurality of anchor channels. Here, the first anchor channel is shown as a topmost anchor channel (e.g., channel 510). However, the at least one synchronization signal may be included in any anchor channel of the plurality of anchor channels. In some aspects, the at least one synchronization signal may be included in the same anchor channel (e.g., in terms of frequency) in each transmission of the plurality of anchor channels. In some aspects, the at least one synchronization signal may be included in a different anchor channel (e.g., in terms of frequency) in two or more transmissions of the plurality of anchor channels.

As shown by reference number 530, in some aspects, the first anchor channel may include one or more NPBCHs and/or one or more MIBs. For example, a first transmission of the first anchor channel, at SFN 0, includes NPBCHs that include MIBs 0 and 1. MIBs 0 and 1 may correspond to self-decodable blocks 0 and 1, described in connection with FIG. 4A, above. Note that self-decodable blocks 0 and 1 of FIG. 4A are included in the first 16 subframes of the segment shown in FIG. 4A. MIBs 0 and 1 may be scrambled similarly to self-decodable blocks 0 and 1 so that UE 120 can determine timing information based at least in part on MIBs 0 and 1. Similarly, a second transmission of the first anchor channel, at SFN 16, includes MIBs 2 and 3, and so on. In some aspects, a first MIB (e.g., MIB 0, MIB 2, etc.) may alternate with a second MIB (e.g., MIB 1, MIB 3, etc.). Additionally, or alternatively, the first anchor channel may include a single transmission of a first MIB and a second MIB. Additionally, or alternatively, the first anchor channel may include multiple consecutive transmissions of the first MIB and multiple consecutive retransmissions of the second MIB. In some aspects, in SFN=64·m to 64·m+63 (i.e., the m-th 640 ms segment relative to SFN=0), the MIB payload may be determined at the start of the $0^{th}$ hopping frame, and the SFN index of the MIB may be the 4 most significant bits (MSB) bits of SFN=64 m.

As shown by reference number 535, in some aspects, a second anchor channel may include one or more NPBCHs and/or one or more MIBs. For example, a first transmission of the second anchor channel, at SFN 0, includes NPBCHs that include MIBs 0 and 1. MIBs 0 and 1 may correspond to self-decodable blocks 0 and 1, described in connection with FIG. 4A, above. For example, MIBs 0 and 1 may be scrambled similarly to self-decodable blocks 0 and 1 so that UE 120 can determine timing information based at least in part on MIBs 0 and 1. Similarly, a second transmission of the second anchor channel, at SFN 16, includes MIBs 2 and 3, and so on. In some aspects, a first MIB (e.g., MIB 0, MIB 2, etc.) may alternate with a second MIB (e.g., MIB 1, MIB 3, etc.). Additionally, or alternatively, the second anchor channel may include a single transmission of a first MIB and a second MIB. Additionally, or alternatively, the second anchor channel may include multiple consecutive transmissions of the first MIB and multiple consecutive retransmissions of the second MIB.

As shown by reference number 540, in some aspects, a third anchor channel may include one or more NPBCHs and/or one or more MIBs. This may be similar to the second anchor channel described above. The frequencies of each anchor channel may be known to the UE 120 before the synchronization operation is performed.

In some aspects, the third anchor channel (shown by reference number 540) may include a system information block (SIB) (not shown). For example, the third anchor channel may include a SIB-a or a different type of SIB. In some aspects, the SIB may store frequency hopping information for the UE 120. For example, the UE 120 may perform frequency hopping based at least in part on a frequency hopping whitelist. The SIB may store the frequency hopping whitelist. UE 120 may use the SIB to determine the frequency hopping whitelist so that UE 120 can communicate with BS 110 based at least in part on the at least one synchronization signal, the NPBCH, and/or the SIB. In some aspects, the frequency hopping whitelist may be conveyed in the MIB. In such a case, the MIB and the corresponding NPDSCH may use TBCC (tail-biting convolutional coding), which may conserve a cyclic redundancy check bit if the frequency hopping whitelist and the MIB are encoded jointly. In some aspects, the frequency hopping whitelist may be transmitted in a last anchor channel, a next-to-last anchor channel, and/or the like. In some aspects, the frequency hopping whitelist may be transmitted in any anchor channel.

In some aspects, the at least one synchronization signal (shown by reference number 525) may indicate a configuration of the plurality of anchor channels. For example, NB-IoT-u (e.g., NB-IoT in the unlicensed spectrum) may require different numbers of anchor channels in different regions (e.g., at least three anchor channels in the United States, and one anchor channel in the European Union, although these are provided merely as examples). The BS 110 may determine the at least one synchronization signal to indicate the configuration of the plurality of anchor channels. Thus, the UE 120 may determine the configuration while performing synchronization on the first anchor channel to avoid blind searching.

In some aspects, the DRS (e.g., NPSS and/or NSSS) on the first transmission of the plurality of anchor channels may be used to provide the configuration. This may allow a UE 120 to determine the configuration more quickly than using a MIB, and may be more reliable than using a MIB. In some aspects, the BS 110 may use a time-domain cyclic shift applied to the NSSS to convey the configuration. For example, the NSSS associated with a single anchor carrier may use 4 time domain cyclic shifts (l=0,33,66,99) to indicate 20 ms segments within a duration of 80 ms, or to signal the second and third least significant bits of the SFN. In NB-IoT-u, the DRS has a period of 160 ms or 320 ms (e.g., according to the hopping frame length), so the cyclic shifts of the NSSS may not be used to indicate the 20 ms segments. Techniques and apparatuses described herein may use the four potential values of the cyclic shift to indicate a configuration of the plurality of anchor channels. For example, one or more values of the cyclic shift may indicate a number of anchor channels of the plurality of anchor channels, or may indicate that a single anchor channel is to be used (e.g., instead of the plurality of anchor channels). Additionally, or alternatively, one or more values of the cyclic shift may indicate whether a particular anchor channel is to include a NPBCH/MIB or a SIB. In this way, the BS 110 may signal a configuration of the anchor channel(s) to the UE 120 using the NPSS, which conserves resources of other parts of the anchor channel and enables efficient synchronization.

As indicated above, FIG. 5 is provided as an example. Other examples are possible and may differ from what was described in connection with FIG. 5.

Figure 6:
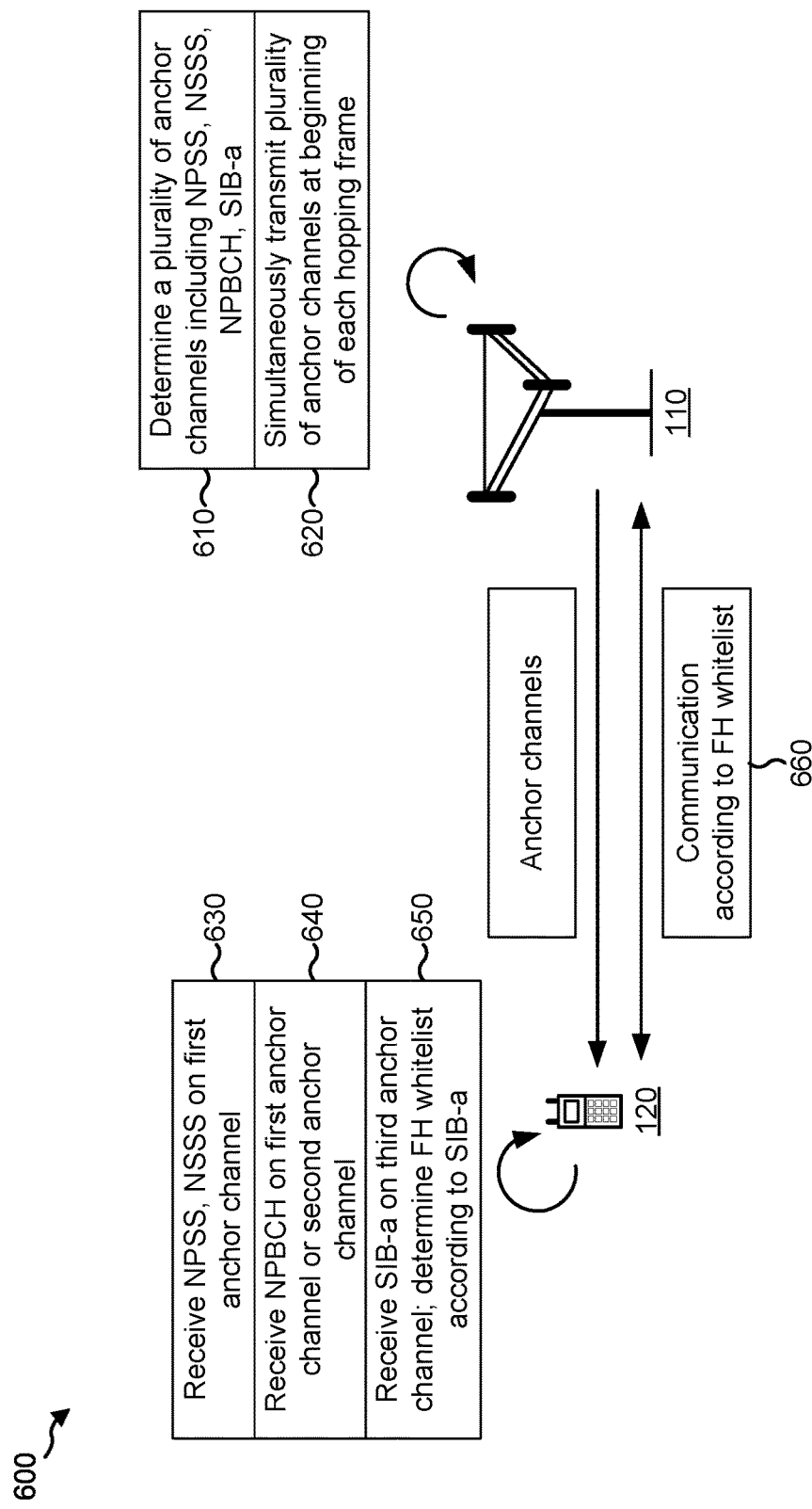
FIG. 6 is a diagram illustrating an example of synchronizing a UE for multiple anchor channels in a narrowband system.

FIG. 6 is a diagram illustrating an example 600 of synchronization according to a plurality of anchor channels.

As shown in FIG. 6, and by reference number 610, a BS 110 may determine a plurality of anchor channels. As further shown, the plurality of anchor channels may include at least one synchronization signal (e.g., an NPSS and an NSSS), an NPBCH (which may include a MIB), and a SIB-a. For example, the SIB-a may carry a frequency hopping whitelist and/or other information. In some aspects, the at least one synchronization signal may indicate a configuration for the plurality of anchor channels. The plurality of anchor channels is described above in more detail in connection with FIGS. 4A, 4B, and 5.

As shown by reference number 620, the BS 110 may simultaneously transmit the plurality of anchor channels. For example, and as shown, the BS 110 may transmit the plurality of anchor channels at the beginning of each hopping frame (e.g., every 160 ms, every 320 ms, etc.). In some aspects, the BS 110 may simultaneously transmit the plurality of anchor channels to at least one UE (e.g., the UE 120).

As shown by reference number 630, the UE 120 may receive the at least one synchronization signal on the first anchor channel. For example, the UE 120 may receive the first anchor channel as part of a synchronization procedure of the UE 120. To perform the synchronization procedure, at initial synchronization, the UE 120 may search for the NPSS and the NSSS and decode the NPBCH in the first anchor channel. In some aspects, the UE 120 may determine a configuration for the plurality of anchor channels based at least in part on the NPSS and/or the NSSS, as described in more detail elsewhere herein.

As shown by reference number 640, the UE 120 may receive the NPBCH in the second anchor channel. For example, if the UE 120 does not receive the NPBCH in the first anchor channel, the UE 120 may receive the NPBCH in the second anchor channel. Additionally, or alternatively, the UE 120 may tune to the second anchor channel when the NPBCH is not successfully received in the first anchor channel (e.g., at the beginning of the next frame or m-frame). In some aspects, if the UE 120 does not successfully decode the NPBCH in the second anchor channel, the UE 120 may tune to the third anchor channel, attempt to decode the NPBCH in the third anchor channel, and so on. In this way, simultaneous transmission of multiple anchor channels improves frequency diversity of the anchor channels, thereby increasing likelihood of success of synchronization.

As shown by reference number 650, the UE 120 may receive the SIB-a on the third anchor channel and may determine the frequency hopping whitelist based at least in part on the SIB-a. As shown by reference number 660, the UE 120 may communicate with the BS 110 based at least in part on the frequency hopping whitelist. For example, the UE 120 may tune to a first set of frequencies and may transmit and/or receive traffic on carriers associated with the first set of frequencies. Then, the UE 120 may tune back to receive the second transmission of the plurality of anchor channels. Next, the UE 120 may tune to a second set of frequencies (e.g., which may be the same as or different than the first set of frequencies), to transmit and/or receive traffic on carriers associated with the second set of frequencies, and so on.

As indicated above, FIG. 6 is provided as an example. Other examples are possible and may differ from what was described with respect to FIG. 6.

Figure 7:
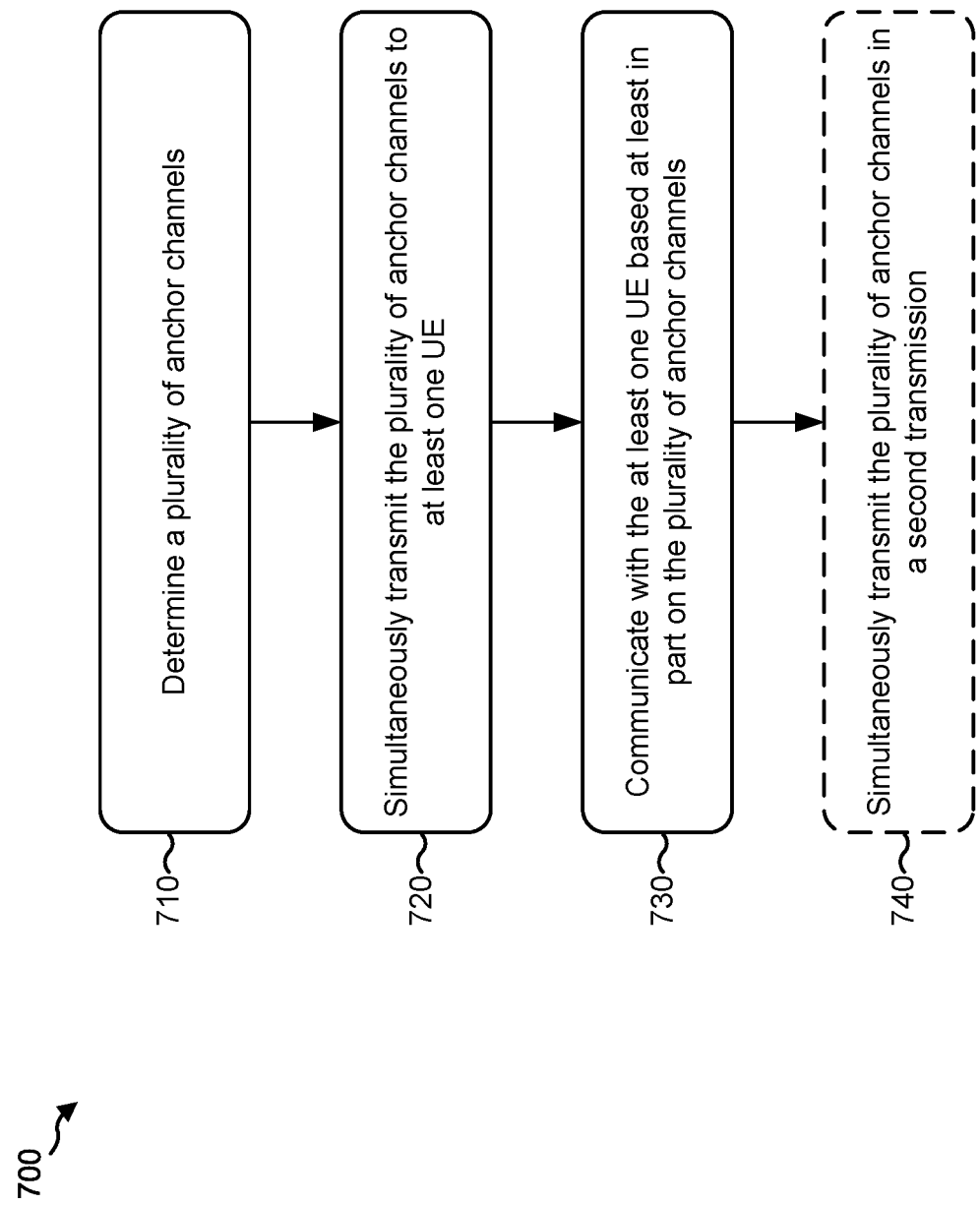
FIG. 7 is a flow chart of a method of wireless communication.

FIG. 7 is a flow chart of a method 700 of wireless communication. The method may be performed by a base station (e.g., the BS 110 of FIG. 1, the apparatus 802/802', and/or the like).

At 710, the base station (e.g., using controller/processor 240 and/or the like) may determine a plurality of anchor channels. For example, the base station may determine (e.g., generate, map, encode, etc.) a plurality of anchor channels. In some aspects, the plurality of anchor channels may be adjacent to each other. In some aspects, some of the plurality of anchor channels may be non-adjacent to each other. In some aspects, the plurality of anchor channels may collectively occupy a bandwidth that satisfies a required minimum bandwidth (e.g., for an unlicensed spectrum). In some aspects, a first anchor channel, of the plurality of anchor channels, may indicate a configuration for the plurality of anchor channels (e.g., using an NSSS and/or the like). In some aspects, at least two anchor channels, of the plurality of anchor channels, may include at least one of a broadcast channel or an information block.

At 720, the base station (e.g., using controller/processor 240, transmit processor 220, TX MIMO processor 230, MOD 232, antenna 234, and/or the like) may simultaneously transmit the plurality of anchor channels to at least one UE. For example, the base station may simultaneously transmit the plurality of anchor channels. In some aspects, the base station may perform a first transmission of the plurality of anchor channels. For example, the base station may repeatedly transmit the plurality of anchor channels (e.g., at beginnings of hopping frames), as described in more detail below.

At 730, the base station (e.g., using controller/processor 240, transmit processor 220, TX MIMO processor 230, MOD 232, antenna 234, and/or the like) may communicate with the at least one UE based at least in part on the plurality of anchor channels. For example, the base station may facilitate synchronization with the UE based at least in part on the plurality of anchor channels. Additionally, or alternatively, the base station may communicate with the at least one UE based at least in part on frequency hopping, and frequency hopping information for the at least one UE may be provided by the base station in the plurality of anchor channels.

At 740, the base station (e.g., using controller/processor 240, transmit processor 220, TX MIMO processor 230, MOD 232, antenna 234, and/or the like) may optionally simultaneously transmit the plurality of anchor channels in a second transmission. For example, the base station may perform a second transmission of the plurality of anchor channels. The second transmission may be different from the first transmission. For example, the second transmission may include a different NPBCH, a different MIB, and/or the like, from the first transmission.

Method 700 may include additional aspects, such as any single aspect or any combination of aspects described below and/or in connection with one or more other processes described elsewhere herein.

In some aspects, the first anchor channel is one of the at least two anchor channels that include the at least one of the broadcast channel or the information block. In some aspects, the plurality of anchor channels are simultaneously transmitted in a first transmission, and the base station may simultaneously transmit the plurality of anchor channels in a second transmission after the first transmission. In some aspects, the first transmission is in a first hopping frame, and the second transmission is in a second hopping frame. In some aspects, the information block included in the first transmission includes a first information block and a second information block of an information block cycle, and wherein an information block included in the second transmission is a third information block and a fourth information block of an information block cycle. In some aspects, the plurality of anchor channels are transmitted periodically or repeatedly. In some aspects, the information block includes a self-decodable master information block. In some aspects, at least one of the at least one synchronization signal, the broadcast channel, or the information block is a discovery reference signal. In some aspects, the plurality of anchor channels comprises discovery reference signal channels. In some aspects, the information block identifies a frequency hopping whitelist for the at least one UE.

In some aspects, the at least one synchronization signal is transmitted in the first anchor channel, the information block is a first information block and is transmitted in a second anchor channel of the plurality of anchor channels, and a second information block comprising a master information block is transmitted with the broadcast channel in a third anchor channel of the plurality of anchor channels. In some aspects, the at least one synchronization signal indicates a configuration of the plurality of anchor channels. In some aspects, the at least one synchronization signal indicates the configuration of the plurality of anchor channels based at least in part on a cyclic shift of the at least one synchronization signal.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
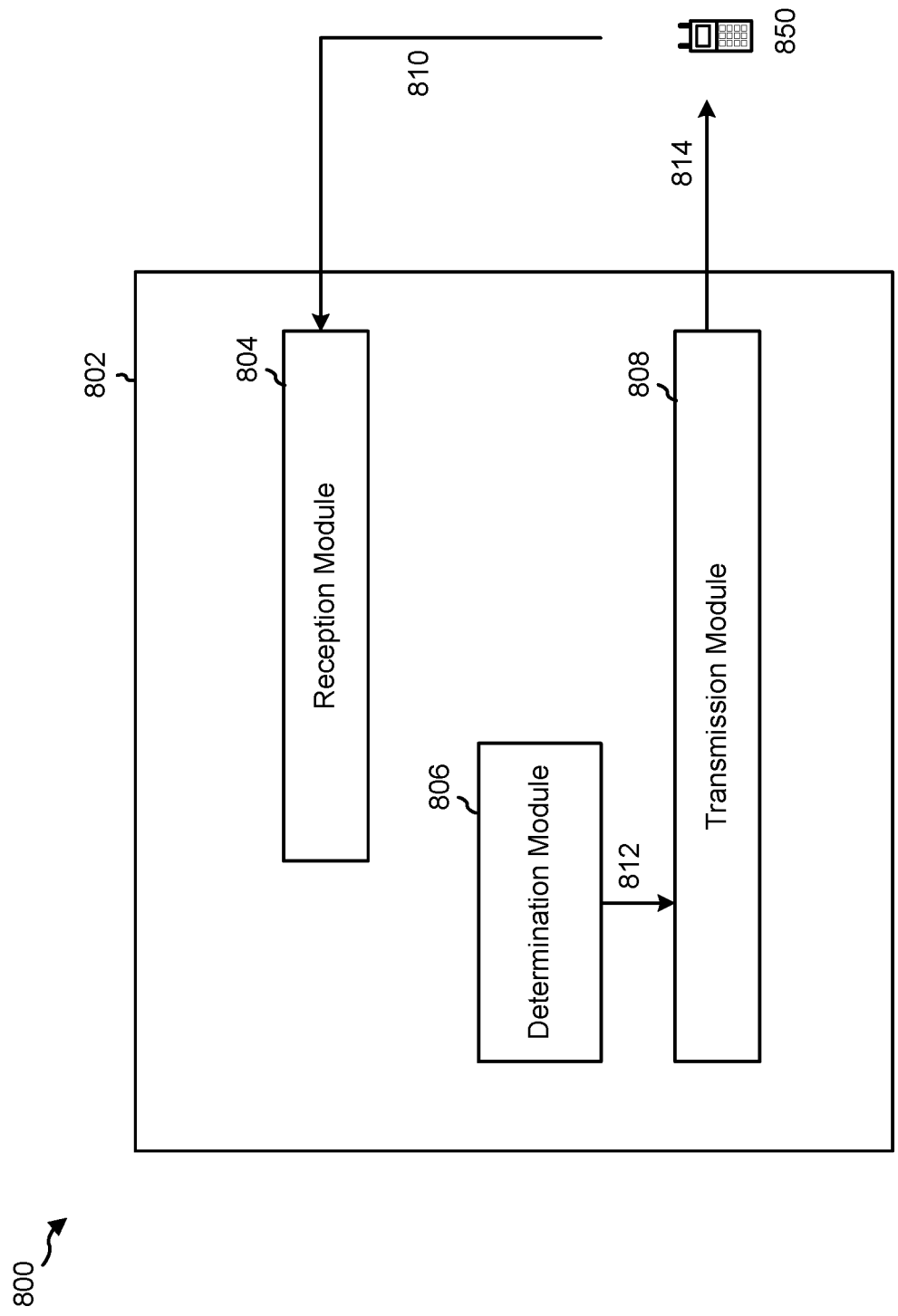
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a base station such as an eNB or gNB (e.g., BS 110). In some aspects, the apparatus 802 includes a reception module 804, a determination module 806, and/or a transmission module 808.

The reception module 804 may receive signals 810 from a wireless communication device 850 (e.g., a UE 120, the apparatus 1102/1102', and/or the like). The signals 810 may include communications, synchronization information, and/or or the like. For example, the reception module 804 and/or the transmission module 808 may communicate with at least one UE (e.g., the wireless communication device 850) based at least in part on a plurality of anchor channels.

The determination module 806 may determine a plurality of anchor channels, wherein a first anchor channel of the plurality of anchor channels includes at least one synchronization signal, and wherein at least two anchor channels of the plurality of anchor channels include at least one of a broadcast channel or an information block. The determination module may provide data 812 to the transmission module 808.

The transmission module 808 may transmit signals 814 based at least in part on the data 812. The signals 814 may carry the plurality of anchor channels (e.g., at least one transmission of the plurality of anchor channels). For example, the transmission module 808 may simultaneously transmit the plurality of anchor channels to at least one UE.

The apparatus may include additional modules that perform each of the blocks of the algorithm in the aforementioned method 700 of FIG. 7 and/or the like. As such, each block in the aforementioned method 700 of FIG. 7 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
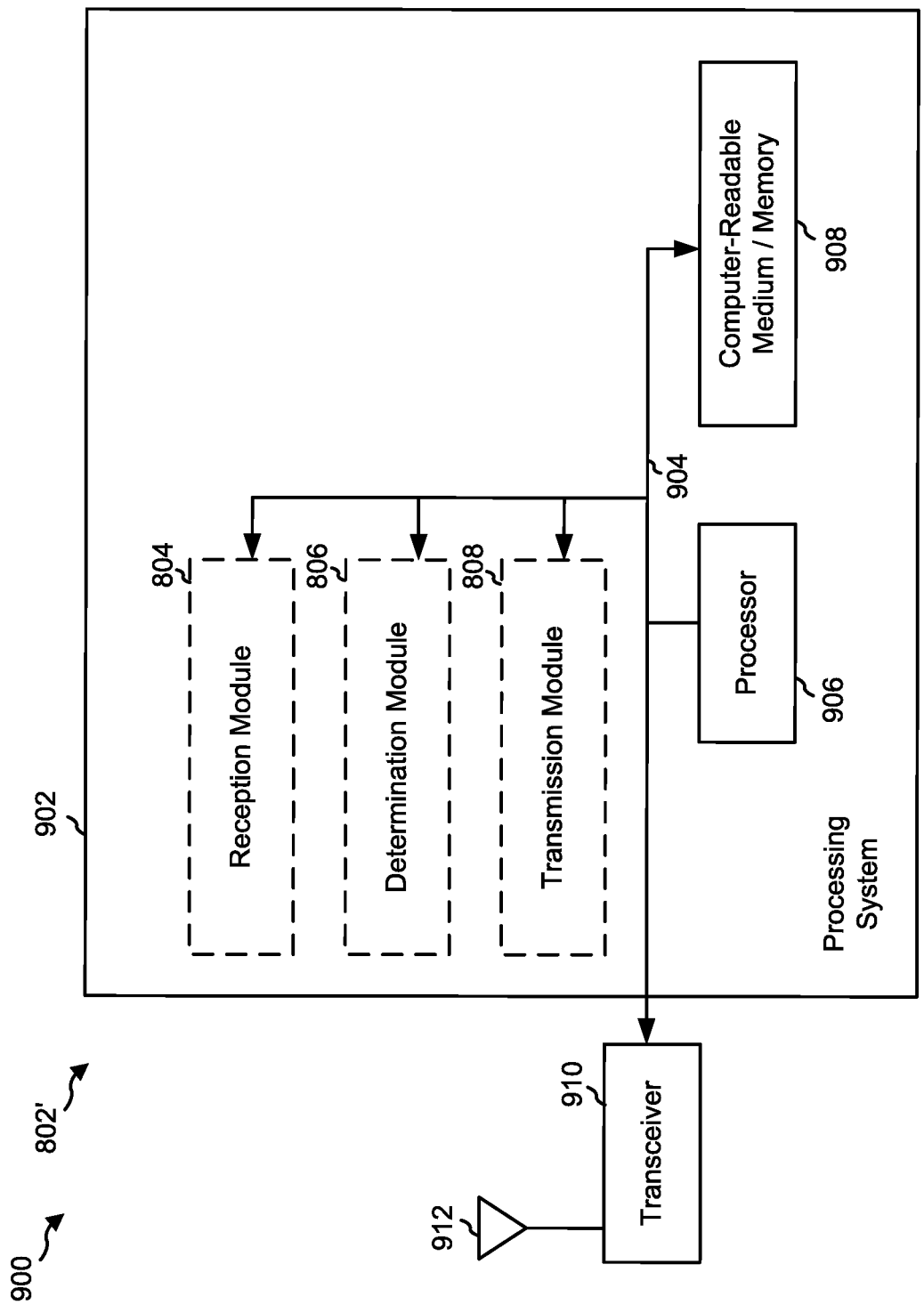
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a base station such as an eNB or gNB.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and the computer-readable medium/memory 908. The bus 904 may also link various other circuits such as timing sources, peripherals, voltage regulators, and power management circuits, which are well known in the art, and therefore will not be described further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer readable medium/memory 908, one or more hardware modules coupled to the processor 906, or some combination thereof. The processing system 902 may be a component of the BS 110 and may include the memory 242 and/or at least one of the TX MIMO processor 230, the receive processor 238, and/or the controller/processor 240.

In some aspects, the apparatus 802/802' for wireless communication includes means for determining a plurality of anchor channels; means for simultaneously transmitting the plurality of anchor channels to at least one UE; means for communicating with the at least one UE based at least in part on the plurality of anchor channels; and means for simultaneously transmitting the plurality of anchor channels in a second transmission. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 9 is provided as an example. Other examples are possible and may differ from what was described in connection with FIG. 9.

Figure 10:
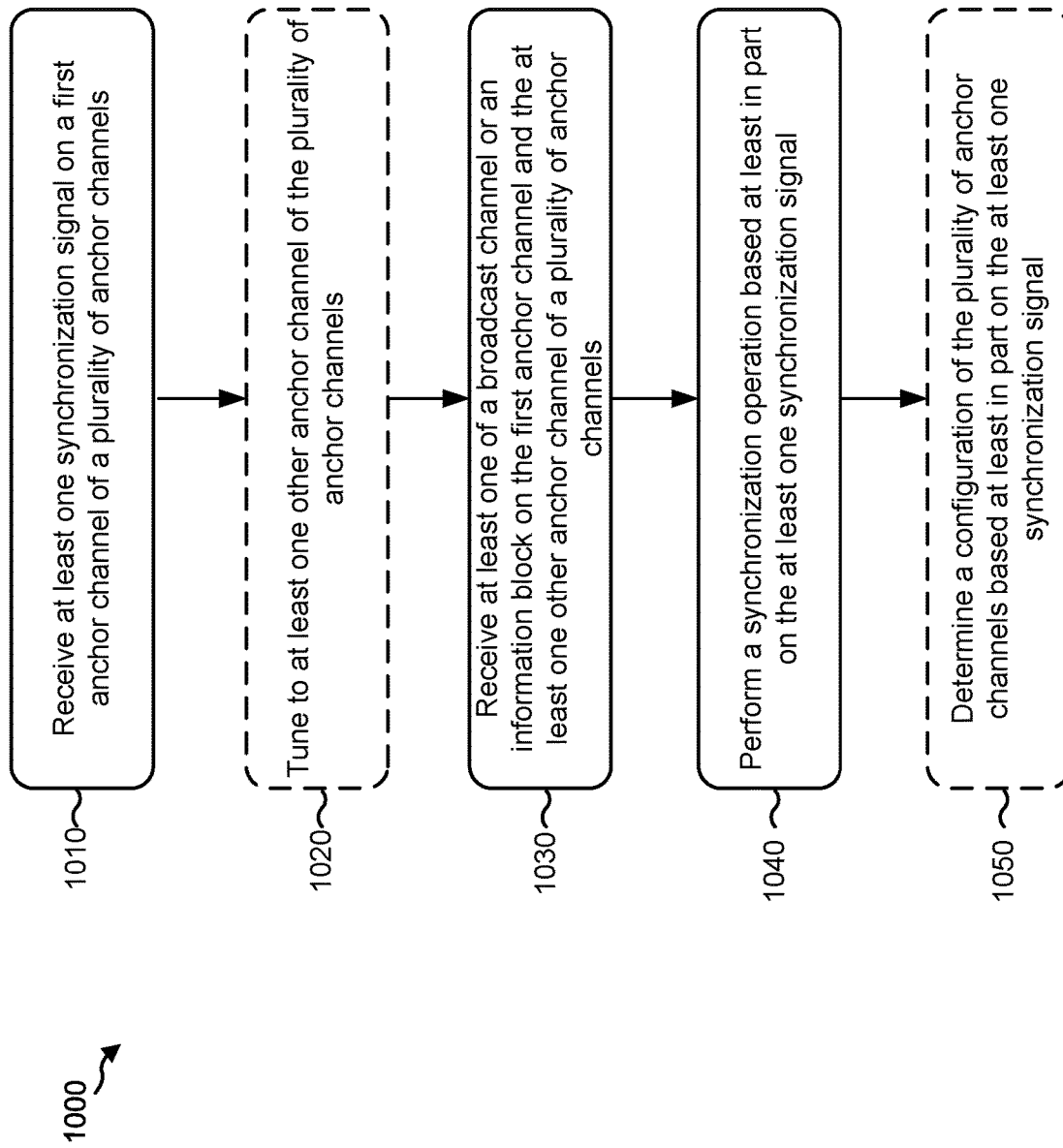
FIG. 10 is a flow chart of a method of wireless communication.

FIG. 10 is a flow chart of a method 1000 of wireless communication. The method may be performed by a user equipment (e.g., the UE 120 of FIG. 1, the apparatus 1102/1102', and/or the like).

At 1010, the UE (e.g., using antenna 252, DEMOD 254, MIMO detector 256, receive processor 258, controller/processor 280, and/or the like) may receive at least one synchronization signal on a first anchor channel of a plurality of anchor channels. For example, the at least one synchronization signal may include a discovery reference signal (e.g., NPSS, NSSS, etc.). In some aspects, the at least one synchronization signal may be received periodically or regularly. The at least one synchronization signal may be received on a first anchor channel, wherein the first anchor channel is one of a plurality of anchor channels that were simultaneously transmitted.

At 1020, the UE (e.g., using antenna 252, DEMOD 254, MIMO detector 256, receive processor 258, controller/processor 280, and/or the like) may optionally tune to at least one other anchor channel of the plurality of anchor channels. For example, if the UE does not successfully receive an NPBCH, MIB, or SIB on the first anchor channel, the UE may tune to at least one other anchor channel of the plurality of anchor channels. In this way, the UE achieves frequency diversity by receiving discovery reference signals on multiple, different anchor channels.

At 1030, the UE (e.g., using antenna 252, DEMOD 254, MIMO detector 256, receive processor 258, controller/processor 280, and/or the like) may receive at least one of a broadcast channel or an information block on the first anchor channel and the at least one other anchor channel of the plurality of anchor channels. For example, the UE may receive the plurality of anchor channels (e.g., irrespective of an anchor channel to which the UE is tuned). The plurality of anchor channels may include the at least one synchronization signal on a first anchor channel, and may include a broadcast channel (e.g., NPBCH, etc.) and/or an information block (e.g., MIB, SIB, etc.) on two or more anchor channels.

At 1040, the UE (e.g., using antenna 252, DEMOD 254, MIMO detector 256, receive processor 258, controller/processor 280, and/or the like) may perform a synchronization operation based at least in part on the at least one synchronization signal. For example, the UE may synchronize with the base station (e.g., BS 110) based at least in part on the at least one synchronization signal. In some aspects, the UE may use multiple transmissions of the plurality of anchor channels to perform the synchronization operation.

At 1050, the UE (e.g., using controller/processor 280 and/or the like) may optionally determine a configuration of the plurality of anchor channels based at least in part on the at least one synchronization signal. For example, the UE may determine how many anchor channels are in the plurality of anchor channels, may determine particular types of information carried by the plurality of anchor channels, and/or the like. In some aspects, the UE may receive or detect other anchor carriers, of the plurality of anchor carriers, based at least in part on the configuration.

Method 1000 may include additional aspects, such as any single aspect or any combination of aspects described below and/or in connection with one or more other processes described elsewhere herein.

In some aspects, the at least one synchronization signal is received in a first transmission of the plurality of anchor channels, and the at least one of the broadcast channel or the information block is received on the at least one other anchor channel in a second transmission of the plurality of anchor channels. In some aspects, the at least one of the broadcast channel or the information block is received in the second transmission based at least in part on reception of the at least one of the broadcast channel or the information block on the first anchor channel in the first transmission being unsuccessful.

In some aspects, the UE may tune to the at least one other anchor channel to receive the at least one of the broadcast channel or the information block. In some aspects, the plurality of anchor channels is transmitted periodically or repeatedly. In some aspects, the information block includes a self-decodable master information block. In some aspects, at least one of the at least one synchronization signal, the broadcast channel, or the information block is a discovery reference signal.

In some aspects, the plurality of anchor channels comprise discovery reference signal channels. In some aspects, the information block identifies a frequency hopping whitelist for the UE. In some aspects, the UE may determine a configuration of the plurality of anchor channels based at least in part on the at least one synchronization signal. In some aspects, the determination is based at least in part on a cyclic shift of the at least one synchronization signal.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
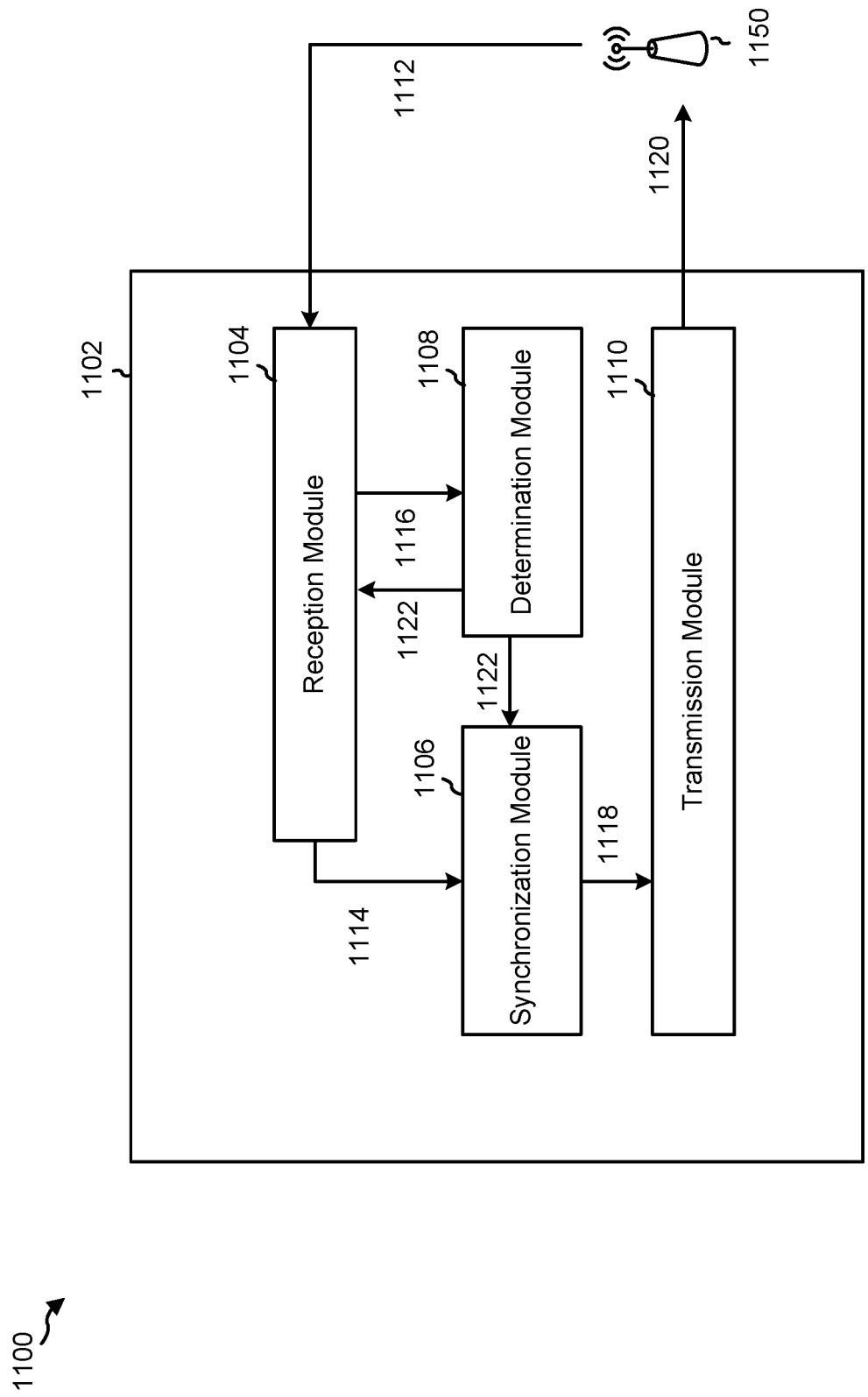
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a UE. In some aspects, the apparatus 1102 includes a reception module 1104, a synchronization module 1106, a determination module 1108, and/or a transmission module 1110.

The reception module 1104 may receive signals 1112 from a base station 1150 (e.g., the BS 110, the apparatus 802/802', etc.). The signals 1112 may include at least one synchronization signal on a first anchor channel, wherein the first anchor channel is one of a plurality of anchor channels that were simultaneously transmitted. Additionally, or alternatively, the signals 1112 may include a broadcast channel and/or an information block on the first anchor channel and at least one other anchor channel of the plurality of anchor channels. The reception module 1104 may provide the signals 1112 to the synchronization module 1106 as data 1114 or the determination module 1108 as data 1116.

The synchronization module 1106 may perform a synchronization operation based at least in part on the synchronization signal, as described in more detail elsewhere herein. The synchronization module 1106 may provide data 1118 to the transmission module 1110, which may communicate based at least in part on the data 1118 by transmitting signals 1120.

The determination module 1108 may determine a configuration of the plurality of anchor channels based at least in part on the at least one synchronization signal. In some aspects, the determination module may provide data 1122 to the synchronization module 1106 and/or the reception module 1104 indicating the configuration.

The apparatus may include additional modules that perform each of the blocks of the algorithm in the aforementioned method 1000 of FIG. 10 and/or the like. As such, each block in the aforementioned method 1000 of FIG. 10 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
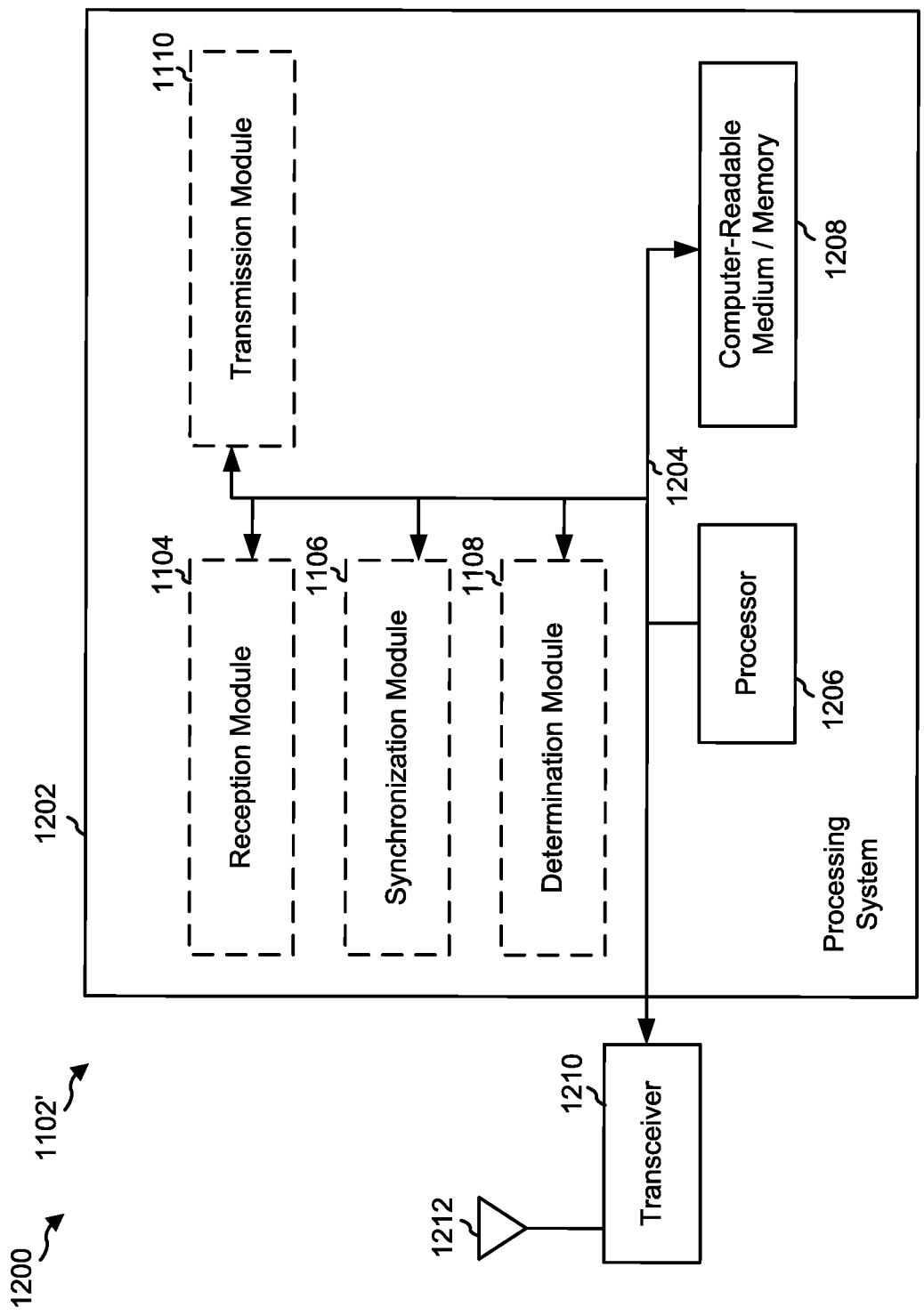
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1110, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, and 1110. The modules may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for receiving at least one synchronization signal on a first anchor channel; means for receiving a broadcast channel and/or an information block on the first anchor channel and at least one other anchor channel of the plurality of anchor channels; means for performing a synchronization operation based at least in part on the synchronization signal; means for tuning to the at least one other anchor channel to receive the broadcast channel and/or the information block; and means for determining a configuration of the plurality of anchor channels based at least in part on the at least one synchronization signal. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a base station, comprising:
   determining a plurality of anchor channels, wherein a first anchor channel of the plurality of anchor channels includes at least one narrowband synchronization signal, and wherein at least two anchor channels of the plurality of anchor channels include at least one of a narrowband broadcast channel or a narrowband information block;
   simultaneously transmitting the plurality of anchor channels to at least one user equipment (UE),
      the plurality of anchor channels having a combined bandwidth that satisfies a minimum bandwidth requirement for an unlicensed frequency spectrum; and
   communicating with the at least one UE based at least in part on the plurality of anchor channels.

2. The method of claim 1, wherein the first anchor channel is one of the at least two anchor channels that include the at least one of the narrowband broadcast channel or the narrowband information block.

3. The method of claim 1, wherein the plurality of anchor channels are simultaneously transmitted in a first transmission, and wherein the method further comprises:
   simultaneously transmitting the plurality of anchor channels in a second transmission after the first transmission.

4. The method of claim 3, wherein the first transmission is in a first hopping frame, and wherein the second transmission is in a second hopping frame.

5. The method of claim 3, wherein the narrowband information block included in the first transmission includes a first information block and a second information block of an information block cycle, and wherein a narrowband information block included in the second transmission is a third information block and a fourth information block of the information block cycle.

6. The method of claim 1, wherein the plurality of anchor channels are transmitted periodically or repeatedly.

7. The method of claim 1, wherein the narrowband information block includes a self-decodable master information block.

8. The method of claim 1, wherein at least one of the at least one narrowband synchronization signal, the narrowband broadcast channel, or the narrowband information block is a discovery reference signal.

9. The method of claim 1, wherein the plurality of anchor channels comprises discovery reference signal channels.

10. The method of claim 1, wherein the narrowband information block identifies a frequency hopping whitelist for the at least one UE.

11. The method of claim 1, wherein the at least one narrowband synchronization signal is transmitted in the first anchor channel, the narrowband information block is a first information block and is transmitted in a second anchor channel of the plurality of anchor channels, and a second information block comprising a master information block is transmitted with the narrowband broadcast channel in a third anchor channel of the plurality of anchor channels.

12. The method of claim 1, wherein the at least one narrowband synchronization signal indicates a configuration of the plurality of anchor channels.

13. The method of claim 12, wherein the at least one narrowband synchronization signal indicates the configuration of the plurality of anchor channels based at least in part on a cyclic shift of the at least one narrowband synchronization signal.

14. A base station for wireless communication, comprising:
  a memory; and
  at least one processor operatively coupled to the memory, the memory and the at least one processor configured to:
    determine a plurality of anchor channels, wherein a first anchor channel of the plurality of anchor channels includes at least one narrowband synchronization signal, and wherein at least two anchor channels of the plurality of anchor channels include at least one of a narrowband broadcast channel or a narrowband information block;
    simultaneously transmit the plurality of anchor channels to at least one user equipment (UE),
      the plurality of anchor channels having a combined bandwidth that satisfies a minimum bandwidth requirement for an unlicensed frequency spectrum; and
    communicate with the at least one UE based at least in part on the plurality of anchor channels.

15. The base station of claim 14, wherein the first anchor channel is one of the at least two anchor channels that include the at least one of the narrowband broadcast channel or the narrowband information block.

16. The base station of claim 14, wherein the plurality of anchor channels are simultaneously transmitted in a first transmission, and wherein the at least one processor is further to:
  simultaneously transmit the plurality of anchor channels in a second transmission after the first transmission.

17. The base station of claim 16, wherein the first transmission is in a first hopping frame, and wherein the second transmission is in a second hopping frame.

18. The base station of claim 16, wherein the narrowband information block included in the first transmission includes a first information block and a second information block of an information block cycle, and wherein a narrowband information block included in the second transmission is a third information block and a fourth information block of the information block cycle.

19. The base station of claim 14, wherein the plurality of anchor channels are transmitted periodically or repeatedly.

20. The base station of claim 14, wherein the narrowband information block includes a self-decodable master information block.

21. The base station of claim 14, wherein at least one of the at least one narrowband synchronization signal, the narrowband broadcast channel, or the narrowband information block is a discovery reference signal.

22. The base station of claim 14, wherein the plurality of anchor channels comprises discovery reference signal channels.

23. The base station of claim 14, wherein the narrowband information block identifies a frequency hopping whitelist for the at least one UE.

24. The base station of claim 14, wherein the at least one narrowband synchronization signal indicates a configuration of the plurality of anchor channels.

25. The base station of claim 24, wherein the at least one narrowband synchronization signal indicates the configuration of the plurality of anchor channels based at least in part on a cyclic shift of the at least one narrowband synchronization signal.

26. The base station of claim 14, wherein the at least one narrowband synchronization signal is transmitted in the first anchor channel, the narrowband information block is a first information block and is transmitted in a second anchor channel of the plurality of anchor channels, and a second information block comprising a master information block is transmitted with the narrowband broadcast channel in a third anchor channel of the plurality of anchor channels.

27. A non-transitory computer-readable medium storing one or more instructions for wireless communication,
  the one or more instructions, when executed by one or more processors of a base station, causing the one or more processors to:
    determine a plurality of anchor channels, wherein a first anchor channel of the plurality of anchor channels includes at least one narrowband synchronization signal, and
  wherein at least two anchor channels of the plurality of anchor channels include at least of a narrowband broadcast channel or a narrowband information block;
    simultaneously transmit the plurality of anchor channels to at least one user equipment (UE),
      the plurality of anchor channels having a combined bandwidth that satisfies a minimum bandwidth requirement for an unlicensed frequency spectrum; and
    communicate with the at least one UE based at least in part on the plurality of anchor channels.

28. The non-transitory computer-readable medium of claim 27, wherein the at least one narrowband synchronization signal indicates a configuration of the plurality of anchor channels.

29. The non-transitory computer-readable medium of claim 28, wherein the at least one narrowband synchronization signal indicates the configuration of the plurality of anchor channels based at least in part on a cyclic shift of the at least one narrowband synchronization signal.

30. An apparatus for wireless communication, comprising:
  means for determining a plurality of anchor channels, wherein a first anchor channel of the plurality of anchor channels includes at least one narrowband synchronization signal, and wherein at least two anchor channels of the plurality of anchor channels include at least one of a narrowband broadcast channel or a narrowband information block;

means for simultaneously transmitting the plurality of anchor channels to at least one user equipment (UE), the plurality of anchor channels having a combined bandwidth that satisfies a minimum bandwidth requirement for an unlicensed frequency spectrum; and means for communicating with the at least one UE based at least in part on the plurality of anchor channels.

31. The apparatus of claim 30, wherein the at least one narrowband synchronization signal indicates a configuration of the plurality of anchor channels.

32. The apparatus of claim 31, wherein the at least one narrowband synchronization signal indicates the configuration of the plurality of anchor channels based at least in part on a cyclic shift of the at least one narrowband synchronization signal.

33. A method of wireless communication performed by a user equipment (UE), comprising:

receiving at least one narrowband synchronization signal on a first anchor channel, wherein the first anchor channel is one of a plurality of anchor channels that were simultaneously transmitted, the plurality of anchor channels having a combined bandwidth that satisfies a minimum bandwidth requirement for an unlicensed frequency spectrum;

receiving at least one of a narrowband broadcast channel or a narrowband information block on the first anchor channel and at least one other anchor channel of the plurality of anchor channels; and performing a synchronization operation based at least in part on the at least one narrowband synchronization signal.

34. The method of claim 33, wherein the at least one narrowband synchronization signal is received in a first transmission of the plurality of anchor channels, and wherein the at least one of the narrowband broadcast channel or the narrowband information block is received on the at least one other anchor channel in a second transmission of the plurality of anchor channels.

35. The method of claim 34, wherein the at least one of the narrowband broadcast channel or the narrowband information block is received in the second transmission based at least in part on reception of the at least one of the narrowband broadcast channel or the narrowband information block on the first anchor channel in the first transmission being unsuccessful.

36. The method of claim 33, further comprising:
tuning to the at least one other anchor channel to receive the at least one of the narrowband broadcast channel or the narrowband information block.

37. The method of claim 33, wherein the plurality of anchor channels is transmitted periodically or repeatedly.

38. The method of claim 33, wherein the narrowband information block includes a self-decodable master information block.

39. The method of claim 33, wherein at least one of the at least one narrowband synchronization signal, the narrowband broadcast channel, or the narrowband information block is a discovery reference signal.

40. The method of claim 33, wherein the plurality of anchor channels comprises discovery reference signal channels.

41. The method of claim 33, wherein the narrowband information block identifies a frequency hopping whitelist for the UE.

42. The method of claim 33, further comprising:
determining a configuration of the plurality of anchor channels based at least in part on the at least one narrowband synchronization signal.

43. The method of claim 42, wherein the determination is based at least in part on a cyclic shift of the at least one narrowband synchronization signal.

44. A user equipment (UE) for wireless communication, comprising:

a memory; and at least one processor operatively coupled to the memory, the memory and the at least one processor to:

receive at least one narrowband synchronization signal on a first anchor channel, wherein the first anchor channel is one of a plurality of anchor channels that were simultaneously transmitted, the plurality of anchor channels having a combined bandwidth that satisfies a minimum bandwidth requirement for an unlicensed frequency spectrum;

receive at least one of a narrowband broadcast channel or a narrowband information block on the first anchor channel and at least one other anchor channel of the plurality of anchor channels; and perform a synchronization operation based at least in part on the at least one narrowband synchronization signal.

45. The UE of claim 44, wherein the at least one narrowband synchronization signal is received in a first transmission of the plurality of anchor channels, and wherein the at least one of the narrowband broadcast channel or the narrowband information block are received on the at least one other anchor channel in a second transmission of the plurality of anchor channels.

46. The UE of claim 45, wherein the at least one of the narrowband broadcast channel or the narrowband information block are received in the second transmission based at least in part on reception of the at least one of the narrowband broadcast channel or the narrowband information block on the first anchor channel in the first transmission being unsuccessful.

47. The UE of claim 44, wherein the at least one processor is further to:
tune to the at least one other anchor channel to receive the at least one of the narrowband broadcast channel or the narrowband information block.

48. The UE of claim 44, wherein the plurality of anchor channels are transmitted periodically or repeatedly.

49. The UE of claim 44, wherein the narrowband information block includes a self-decodable master information block.

50. The UE of claim 44, wherein at least one of the at least one narrowband synchronization signal, the narrowband broadcast channel, or the narrowband information block is a discovery reference signal.

51. The UE of claim 44, wherein the plurality of anchor channels comprises discovery reference signal channels.

52. The UE of claim 44, wherein the narrowband information block identifies a frequency hopping whitelist for the UE.

53. The UE of claim 44, wherein the at least one processor is further to:

determine a configuration of the plurality of anchor channels based at least in part on the at least one narrowband synchronization signal.

54. The UE of claim 53, wherein the determination is based at least in part on a cyclic shift of the at least one narrowband synchronization signal.

55. A non-transitory computer-readable medium storing one or more instructions,
the one or more instructions, when executed by one or more processors of a user equipment, causing the one or more processors to:
receive at least one narrowband synchronization signal on a first anchor channel, wherein the first anchor channel is one of a plurality of anchor channels that were simultaneously transmitted,
the plurality of anchor channels having a combined bandwidth that satisfies a minimum bandwidth requirement for an unlicensed frequency spectrum;
receive at least one of a narrowband broadcast channel or a narrowband information block on the first anchor channel and at least one other anchor channel of the plurality of anchor channels; and
perform a synchronization operation based at least in part on the at least one narrowband synchronization signal.

56. The non-transitory computer-readable medium of claim 55, wherein the one or more instructions, when executed by the one or more processors, cause the one or more processors to:
determine a configuration of the plurality of anchor channels based at least in part on the at least one narrowband synchronization signal.

57. The non-transitory computer-readable medium of claim 56, wherein the determination is based at least in part on a cyclic shift of the at least one narrowband synchronization signal.

58. An apparatus for wireless communication, comprising:
means for receiving at least one narrowband synchronization signal on a first anchor channel, wherein the first anchor channel is one of a plurality of anchor channels that were simultaneously transmitted,
the plurality of anchor channels having a combined bandwidth that satisfies a minimum bandwidth requirement for an unlicensed frequency spectrum;
means for receiving a narrowband broadcast channel and/or a narrowband information block on the first anchor channel and at least one other anchor channel of the plurality of anchor channels; and
means for performing a synchronization operation based at least in part on the at least one narrowband synchronization signal.

59. The apparatus of claim 58, further comprising:
means for determining a configuration of the plurality of anchor channels based at least in part on the at least one narrowband synchronization signal.

60. The apparatus of claim 59, wherein the determination is based at least in part on a cyclic shift of the at least one narrowband synchronization signal.

* * * * *